(12) United States Patent
Brandt

(10) Patent No.: US 11,030,560 B1
(45) Date of Patent: Jun. 8, 2021

(54) DISPATCH SYSTEM

(71) Applicant: BRANDT VX LLC, San Antonio, TX (US)

(72) Inventor: Joshua Brandt, San Antonio, TX (US)

(73) Assignee: BRANDT VX LLC, San Antonio, TX (US)

( * ) Notice: Subject to any disclaimer, the term of this patent is extended or adjusted under 35 U.S.C. 154(b) by 385 days.

(21) Appl. No.: 16/003,828

(22) Filed: Jun. 8, 2018

Related U.S. Application Data

(63) Continuation of application No. 15/906,066, filed on Feb. 27, 2018, now abandoned, which is a continuation of application No. 13/839,679, filed on Mar. 15, 2013, now abandoned.

(60) Provisional application No. 61/720,814, filed on Oct. 31, 2012, provisional application No. 61/745,095, filed on Dec. 21, 2012.

(51) Int. Cl.
| | |
|---|---|
| *G06Q 10/06* | (2012.01) |
| *G08G 1/00* | (2006.01) |
| *G06F 3/0484* | (2013.01) |
| *G06F 3/0482* | (2013.01) |

(52) U.S. Cl.
CPC . *G06Q 10/06315* (2013.01); *G06Q 10/06314* (2013.01); *G08G 1/202* (2013.01); *G06F 3/0482* (2013.01); *G06F 3/04847* (2013.01)

(58) Field of Classification Search
None
See application file for complete search history.

(56) References Cited

U.S. PATENT DOCUMENTS

| | | | |
|---|---|---|---|
| 5,636,122 A | 6/1997 | Shah et al. | |
| 6,058,370 A | 5/2000 | Church et al. | |
| 6,317,720 B1 | 11/2001 | Murakami et al. | |
| 6,339,745 B1 * | 1/2002 | Novik | G07C 5/008 342/357.31 |
| 6,611,755 B1 | 8/2003 | Coffee et al. | |
| 7,584,029 B2 | 9/2009 | Legate et al. | |
| 2001/0051888 A1 | 12/2001 | Mayhak et al. | |
| 2002/0077876 A1 | 6/2002 | O'Meara et al. | |
| 2003/0028536 A1 | 2/2003 | Singh et al. | |

(Continued)

OTHER PUBLICATIONS

EnRoute Ambulance CAD; EnRoute Emergency Systems; 2008; 2 pages.

(Continued)

*Primary Examiner* — Jerry O'Connor
*Assistant Examiner* — Abhijit B Sadananda

(57) ABSTRACT

This disclosure relates to a dispatch system that includes a network interface, a display, a memory, one or more mobile units, a requisition interface presented on the display, a first calculator that calculates at least one time value based on a difference in time-stamps of time-stamped events, a clock module including a sliding time window, wherein the sliding time window is a pre-defined interval of time prior to a current time, a second calculator that tracks assigned mobile units and mission ready mobile units based on the sliding time window of the clock module, calculates a workload value for each requisition over the pre-defined interval of time of the clock module that is immediately prior to the time of the requisition, and calculates a percentage of non-compliant requisitions, a schedule builder that builds a schedule, and a dispatcher that dispatches at least one available mobile in accordance with the schedule.

1 Claim, 32 Drawing Sheets

(56) References Cited

U.S. PATENT DOCUMENTS

| | | |
|---|---|---|
| 2005/0015504 A1 | 1/2005 | Dorne et al. |
| 2005/0038581 A1 | 2/2005 | Kapolka et al. |
| 2006/0282301 A1 | 12/2006 | Olson |
| 2007/0038338 A1* | 2/2007 | Larschan ............... G07C 5/085 701/2 |
| 2007/0173993 A1* | 7/2007 | Nielsen ................. G07C 5/085 701/33.4 |
| 2009/0054029 A1 | 2/2009 | Hogberg et al. |
| 2009/0135027 A1* | 5/2009 | Battista ................... G08G 1/20 340/992 |
| 2009/0180606 A1* | 7/2009 | Omiya .................. G06Q 10/06 379/265.05 |
| 2009/0326991 A1* | 12/2009 | Wei ................. G06Q 10/08 705/5 |
| 2010/0185486 A1 | 6/2010 | Barker et al. |
| 2010/0238009 A1 | 9/2010 | Cook et al. |
| 2011/0029141 A1 | 2/2011 | Sun et al. |
| 2011/0184774 A1* | 7/2011 | Forstall ................. G06Q 50/30 705/7.25 |
| 2012/0226390 A1* | 9/2012 | Adams .................. G07C 5/008 701/1 |
| 2012/0232943 A1 | 9/2012 | Myr |
| 2012/0253862 A1* | 10/2012 | Davidson ......... G06Q 10/06 705/7.11 |
| 2012/0256770 A1* | 10/2012 | Mitchell ............... G08G 1/127 340/989 |
| 2013/0144831 A1 | 6/2013 | Atlas |
| 2014/0046585 A1 | 2/2014 | Morris, IV et al. |

OTHER PUBLICATIONS

EnRoute Ambulance I-Status; EnRoute Emergency Systems; 2008; 2 pages.
EnRoute Ambulance Mobile; EnRoute Emergency Systems; 2008; 2 pages.
EnRoute Mapping; EnRoute Emergency Systems; 2008; 2 pages.
Emergency Management Mapping Application Whitepaper; Towson University Center for Geographic Information Sciences; Oct. 2008; 17 pages.
Horn, Mart E.T. "Fleet Scheduling and Dispatching for Demand-Responsive Passenger Services". Transportation Research C, vol. 10, No. 1, Feb. 2002, p. 35-63.
Haghani, Ali and Yang, Saini. "Real-Time Emergency Response Fleet Deployment: Concepts, Systems, Simulation & Case Studies". Dynamic Fleet Management, edited by Vasileios Zeimpekis, Christos D. Tarantillis, George M. Giaglis, and Ioanna Minnis. Operations Research/Computer Science Interface Series, vol. 38, Springer, 2007, p. 133-162.
Chang, Mei-Shiang, Hsueh, Che-Fu, and Chen, Shyang-Ruey. "Real-Time Vehicle Routing Problem with Time Windows and Simultaneous Delivery/Pickup Demands". Journal of the Eastern Asia Society for Transportation Studies, vol. 5, Oct. 2003, p. 2273-2286.
Liao, Tsai-Yun and Hu, Ta-Yin. "An Object-Oriented Evaluation Framework for Dynamic Vehicle Routing Problems under Real-Time Information". Expert Systems with Applications, vol. 38, No. 10, Sep. 2011, p. 12548-12558.

\* cited by examiner

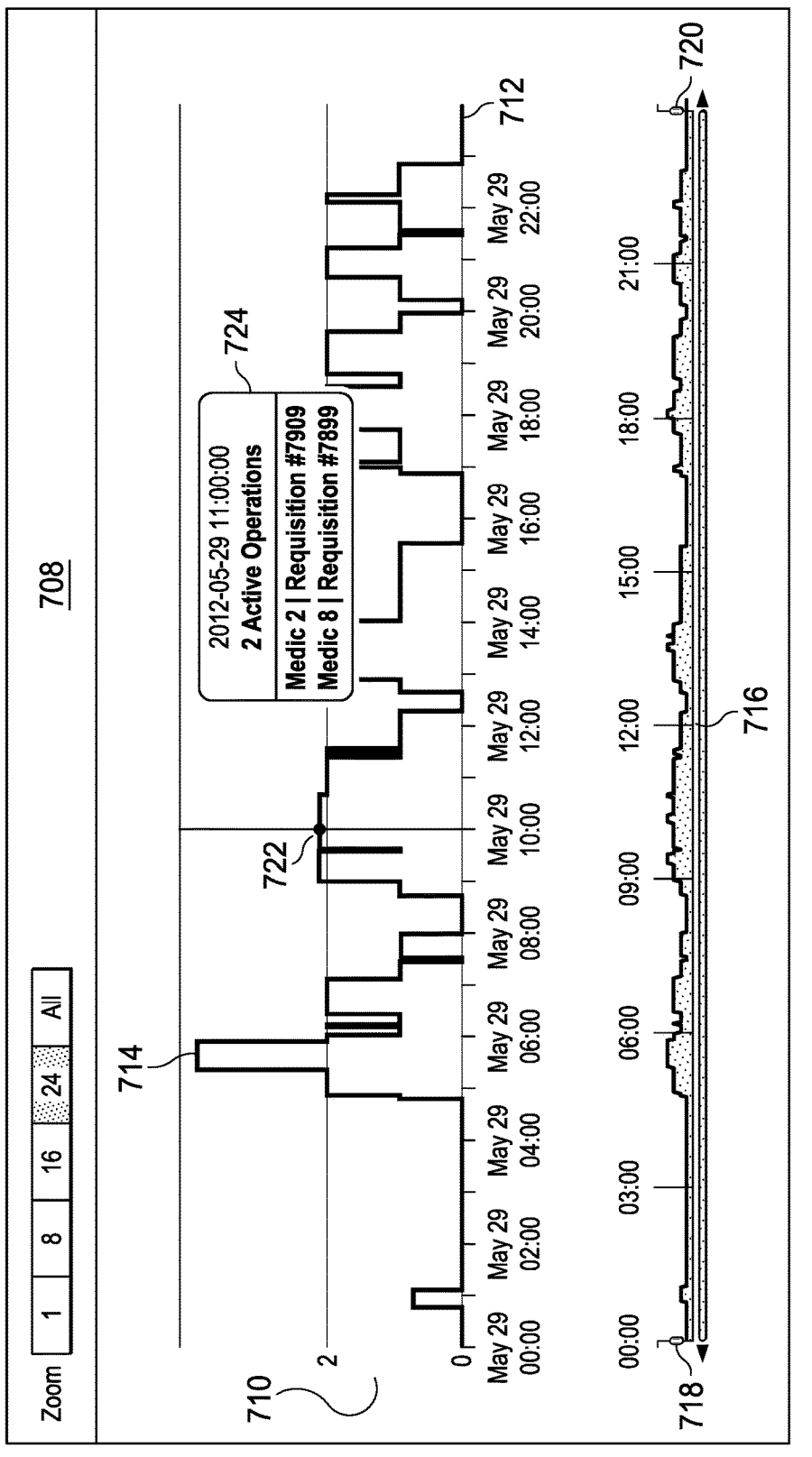

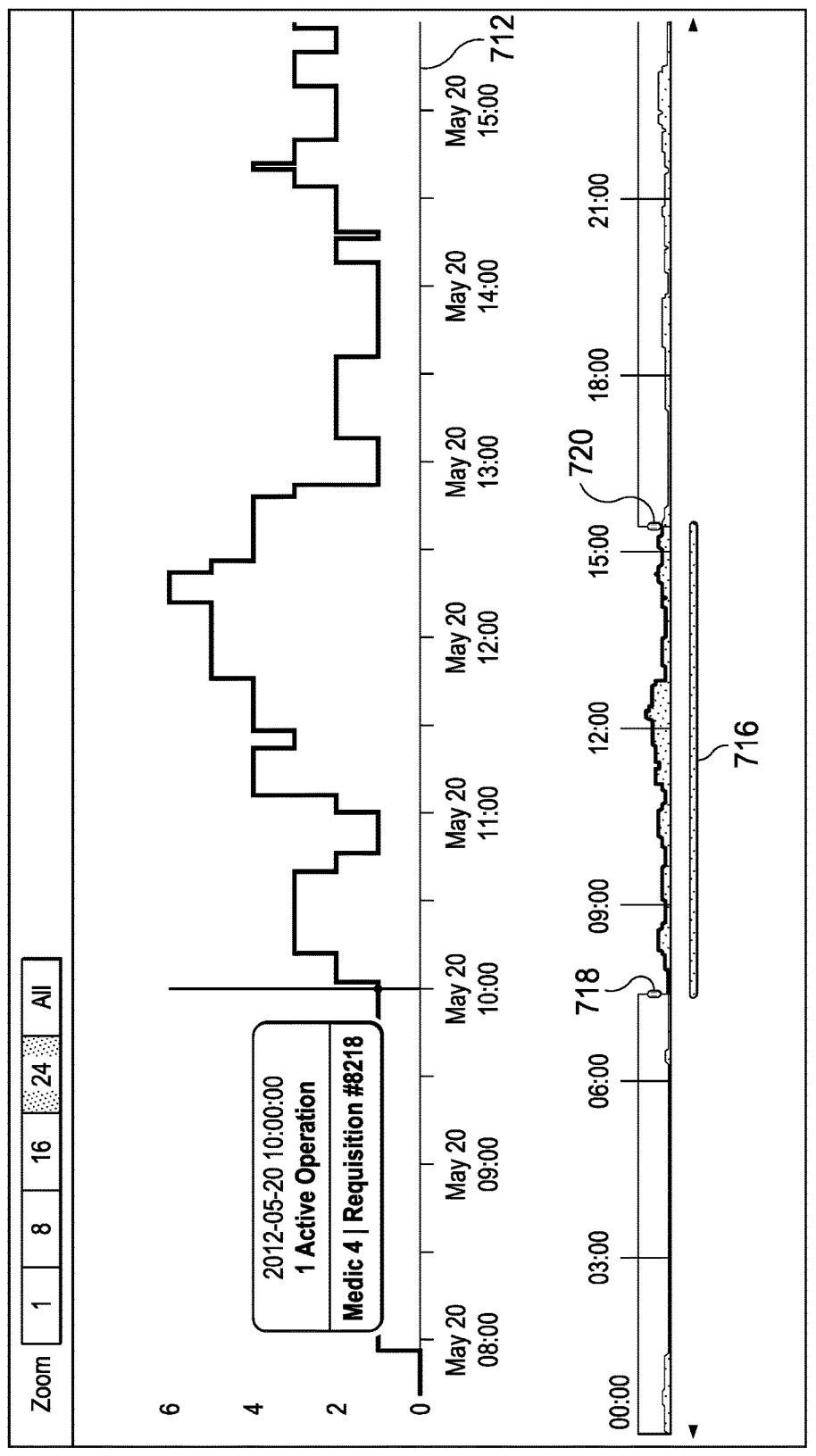

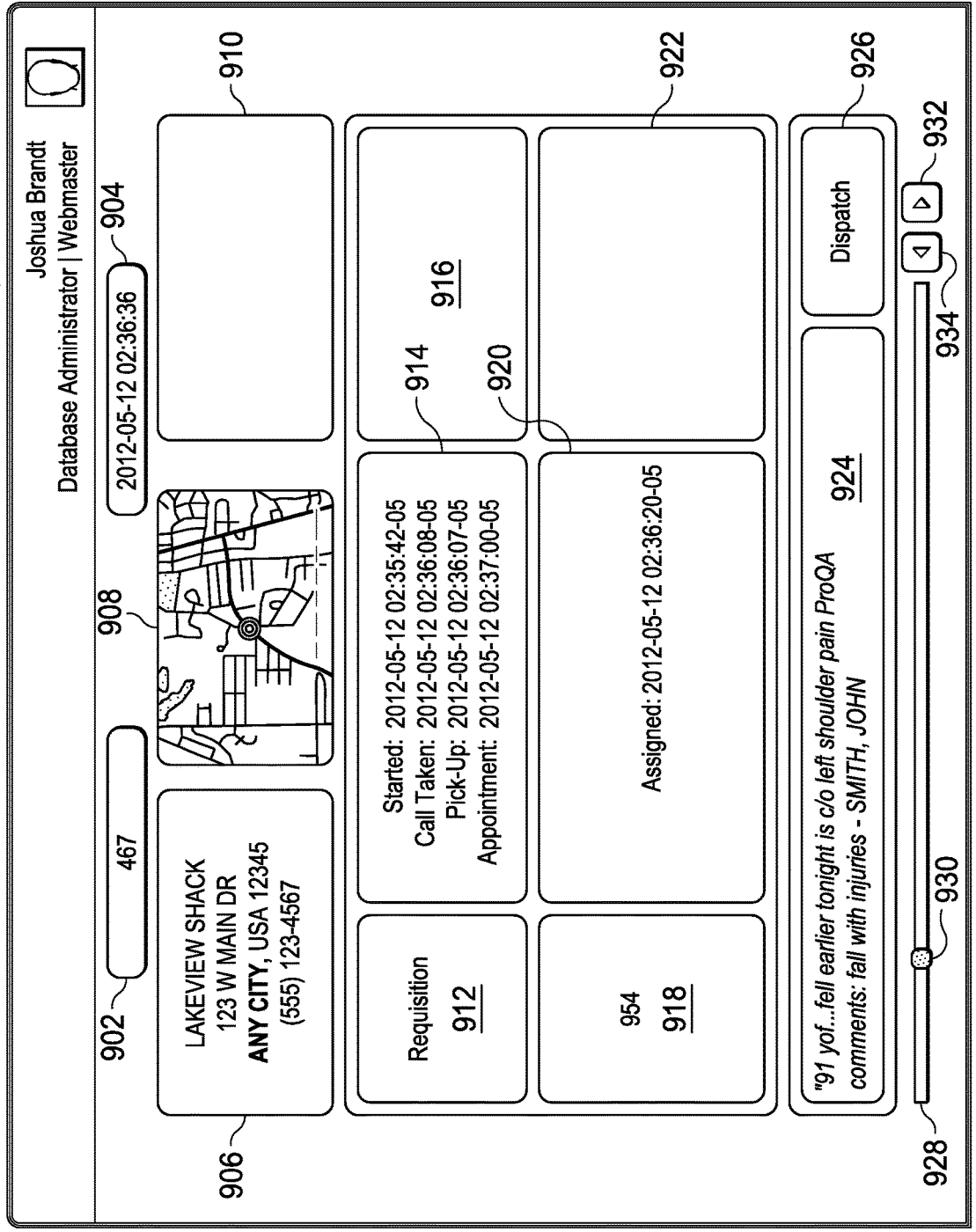

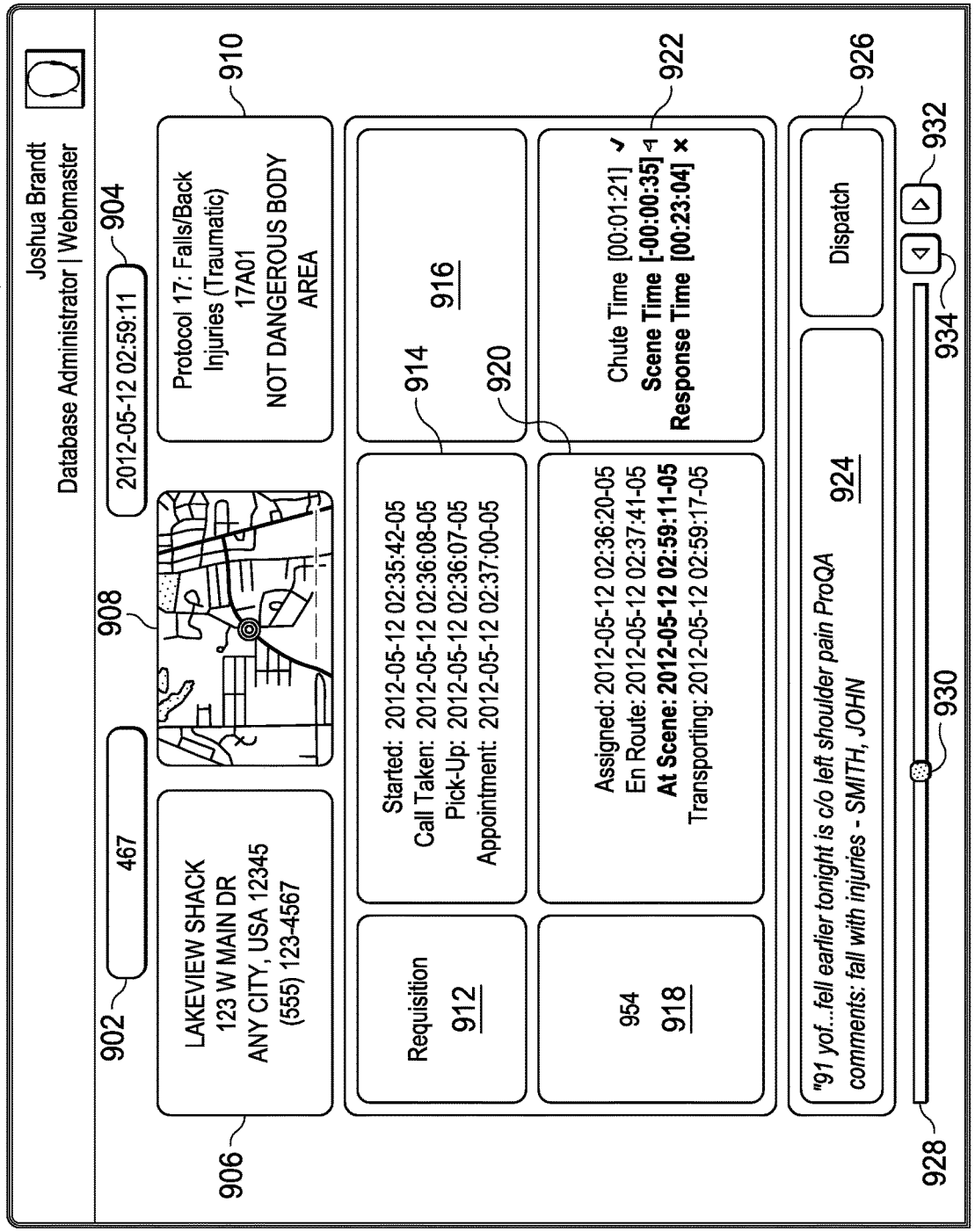

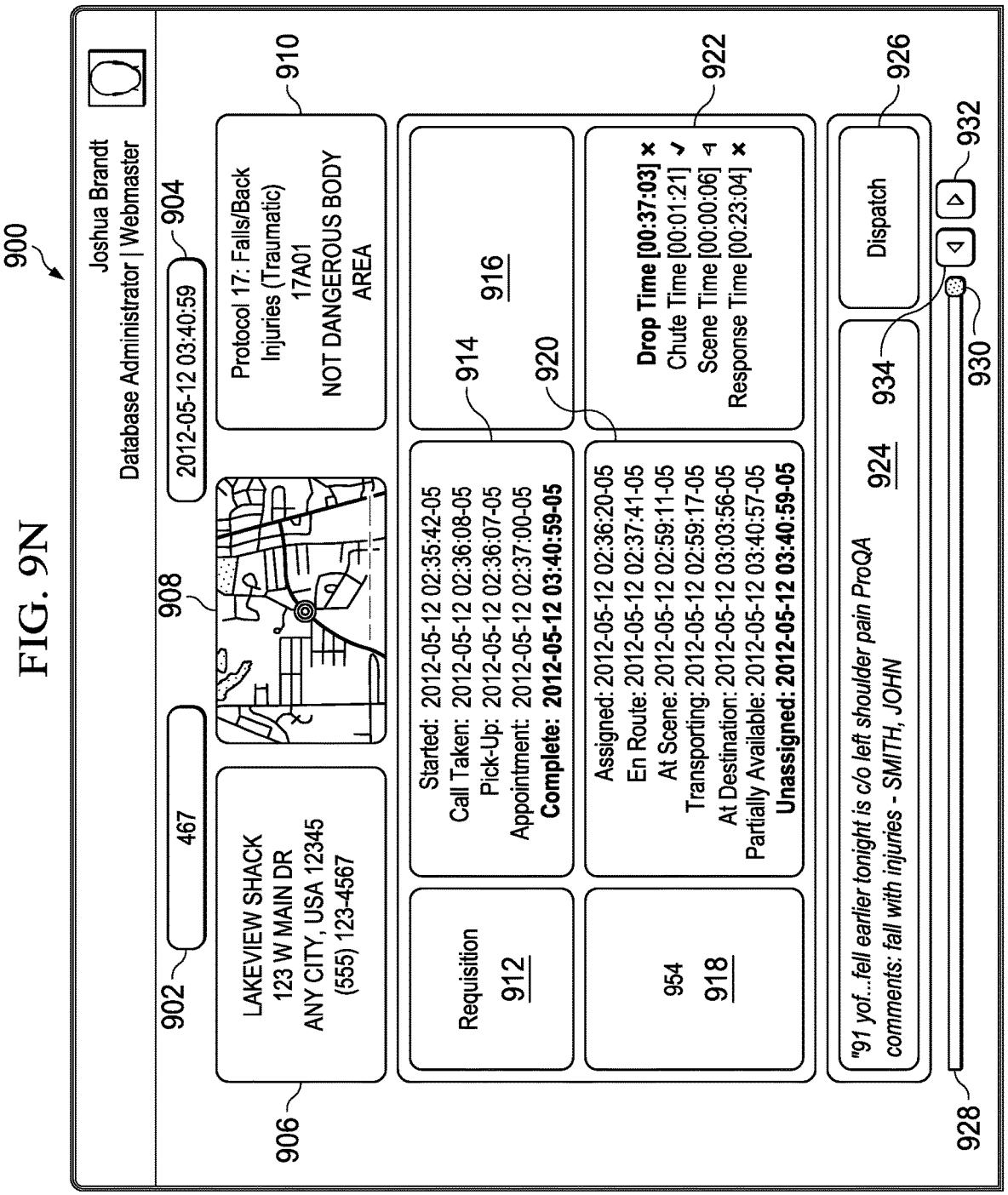

FIG. 10

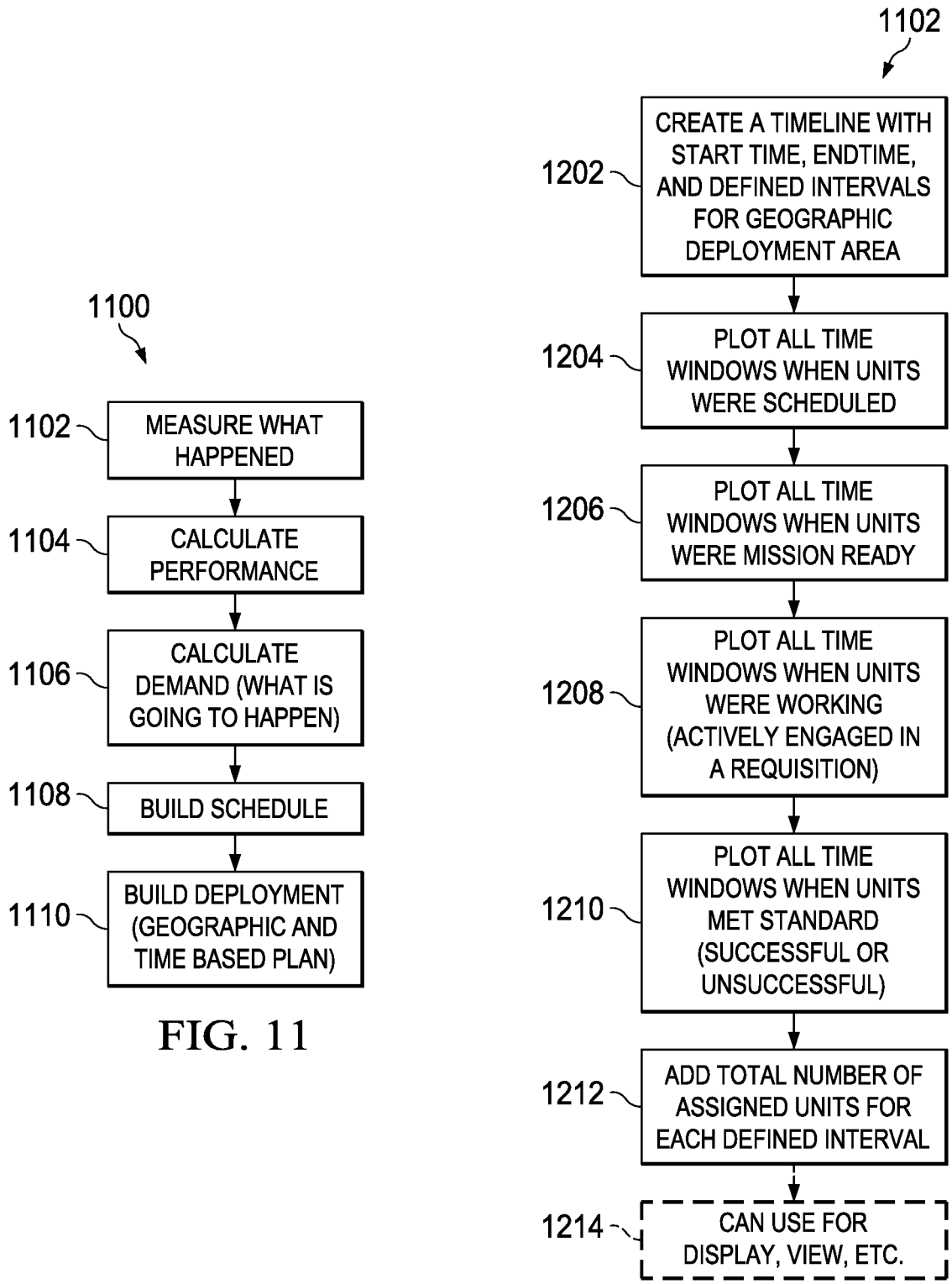

US 11,030,560 B1

DISPATCH SYSTEM

CROSS-REFERENCE TO RELATED APPLICATIONS

This application is a continuation of U.S. patent application Ser. No. 15/906,066, filed Feb. 27, 2018, and entitled SYSTEM AND METHOD FOR ALLOCATING AND TRACKING PERFORMANCE OF MOBILE RESOURCES. U.S. patent application Ser. No. 15/906,066 is a continuation of U.S. patent application Ser. No. 13/839,679, filed Mar. 15, 2013, entitled SYSTEM AND METHOD FOR ALLOCATING AND TRACKING PERFORMANCE OF MOBILE RESOURCES. This application also claims the benefit of U.S. Provisional Application No. 61/720,814, filed Oct. 31, 2012, entitled SYSTEMS AND METHODS FOR LIVE AND REPLAY UTILIZATION AND TRACKING OF VEHICULAR MOVEMENT AND RESPONSE, and U.S. Provisional Application No. 61/745,095, filed Dec. 21, 2012, entitled SYSTEM AND METHOD FOR ALLOCATING AND TRACKING PERFORMANCE OF MOBILE RESOURCES. The specifications of Ser. No. 15/906,066, 13/839,679, 61/720,814, and 61/745,095 are incorporated herein by reference in their entirety.

TECHNICAL FIELD

This application is directed to a dispatch system for dispatching mobile units.

BACKGROUND

Traditional allocation methods for mobile resources generally fail to adequately track the performance of those resources and involve a certain amount of guesswork in their allocation. Accordingly, improved systems and methods are needed.

BRIEF DESCRIPTION OF THE DRAWINGS

For a more complete understanding, reference is now made to the following description taken in conjunction with the accompanying Drawings in which:

FIGS. 7A and 7B illustrate one embodiment of a screen displaying an operational landscape;

FIGS. 8A and 8B illustrate another embodiment of a screen displaying an operational landscape;

FIG. 10 illustrates another embodiment of a screen displaying requisition information;

FIG. 11 illustrates a flow chart of one embodiment of a method that may be used with the resource management system of FIG. 1A;

FIGS. 12-16 illustrate more detailed embodiments of various steps of the flow chart of FIG. 11;

DETAILED DESCRIPTION

Figure 1A:
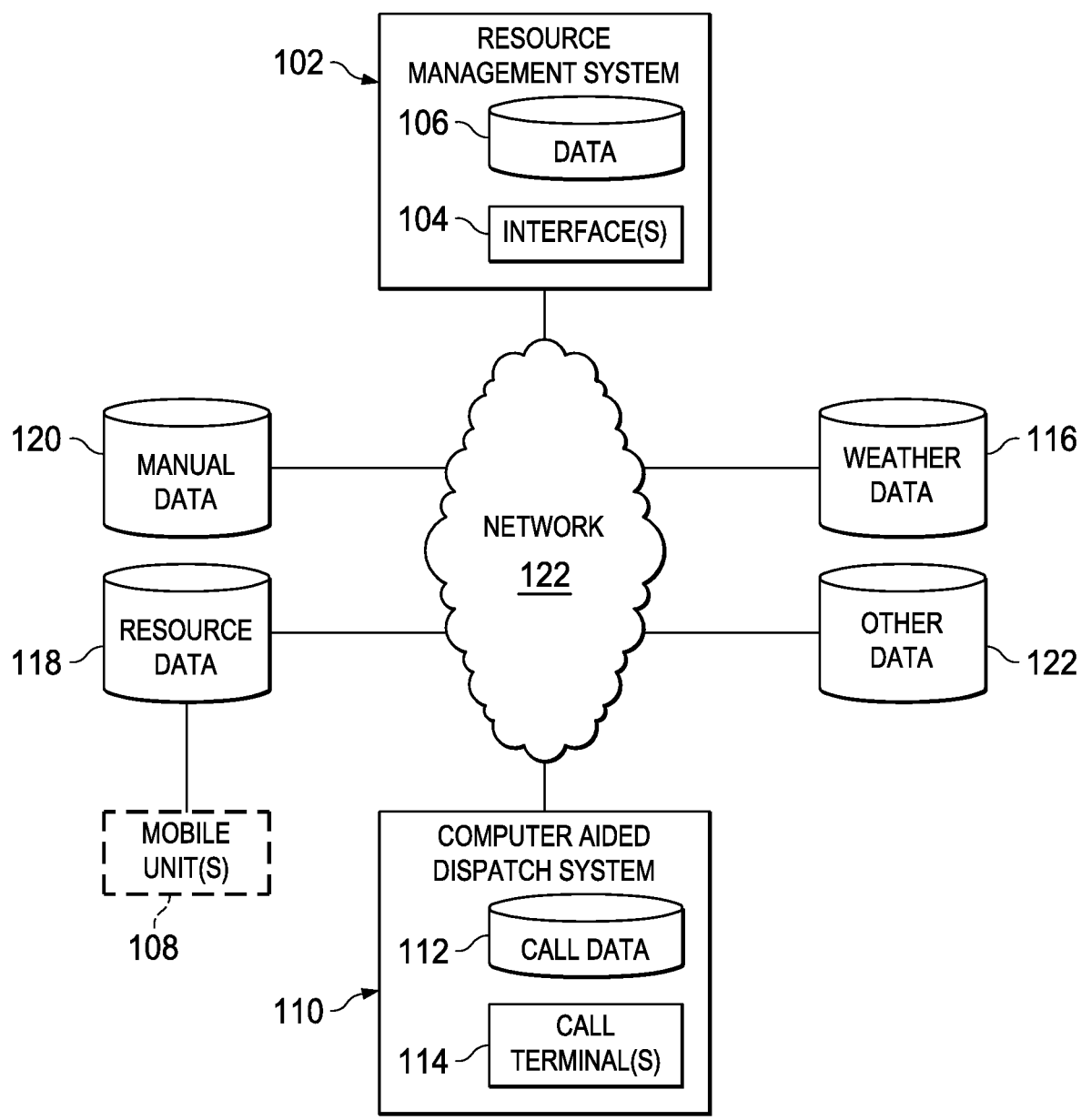
FIG. 1A illustrates one embodiment of an environment within which a resource management system may operate according to aspects of the present disclosure.

Referring now to the drawings, wherein like reference numbers are used herein to designate like elements throughout, the various views and embodiments of a dispatch system are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring to FIG. 1A, one embodiment of an environment 100 is illustrated. The environment 100 includes a resource management system 102 that includes one or more interfaces 104 and one or more databases 106. As will be described below, the resource management system 102 is configured to process information from multiple sources and to produce performance data and/or scheduling data that may be used to determine how to allocate mobile resources (e.g., fire, police, ambulance, and/or other types of vehicles, personnel, and/or equipment). The interface 104 may include any input and/or output interface that is used by any user and/or system to access data in the database 106 and to store data in the database 106. Accordingly, the interface 104 may be any interface through which data must pass when being stored or retrieved in the database 106, and may provide various functions needed to access and/or store data.

The environment 100 includes one or more mobile units 108. A computer aided dispatch (CAD) system 110 may include one or more call terminals 112 and a call database 114. The CAD system 110 may be responsible for communicating with the mobile units 108 and dispatching the mobile units 108 on actual calls. For example, if an emergency call (e.g., a 911 call) is received by the CAD system 110, the CAD system may contact one or more of the mobile units 108, provide the mobile unit(s) 108 with information necessary to respond to the call, and instruct the mobile unit(s) 108 to respond.

Other data sources may include weather data 116, resource (e.g., personnel and/or vehicle) data 118, and manually entered data 120. The resource management system 102 may be coupled to the CAD system 110, weather data 116, resource data 118, and manually entered data 120 via a network 122. For example, if the mobile unit 108 is an ambulance, the vehicle is a resource and may send back location information, diagnostics, and any other information that may be used by the resource management system 102. Accordingly, information from gyroscopes, global positioning satellite (GPS) devices, accelerometers, and similar devices may be used. Furthermore, each person (who may be referred to herein as a "soul") working on the vehicle is a resource and may have a location device, an emergency beacon, a communication device, and/or other devices that can relay and/or store information. It is understood that any type of data 122 may be available to the resource management system 102, either directly or via another system. In some embodiments, the resource management system 102 may include or be otherwise combined with another system, such as the CAD system 110.

In the present example, the resource management system 102 collects data from one or more of the data sources and then processes the data collectively. The data may be used to calculate demand that is then used to build a schedule, and the schedule may be used to build a deployment plan. To achieve this, the resource management system 102 may not only collect data, but may be configured so that a user has the ability to set any field in the database 106. As will be described later in greater detail, the resource management system 102 may track user-made changes to detect data manipulation that can compromise the integrity of the resource management system 102. Other information may be provided, such as whether particular data came from an automated system or was manually entered. The data may be pulled or pushed, depending on the particular implementation of the resource management system 102 and the source of the data.

Figure 1B:
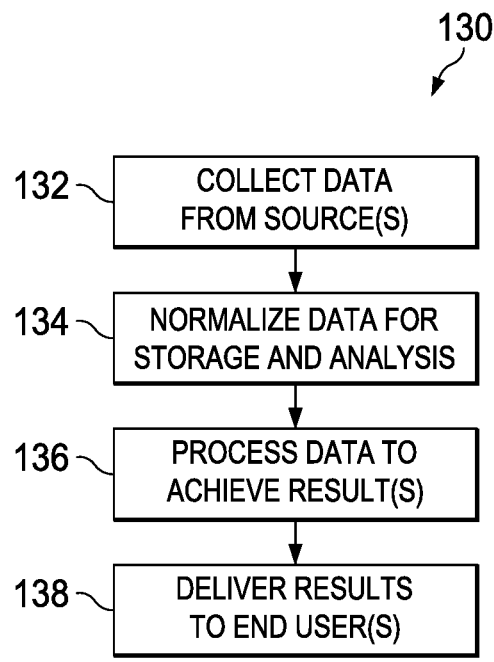
FIG. 1B illustrates a flow chart of one embodiment of a method that may be used with the resource management system of FIG. 1A.

With additional reference to FIG. 1B, a method 130 illustrates one embodiment of a process that may be executed within the environment 100 of FIG. 1A. In step 132, the resource management system 102 pulls or otherwise obtains data from various sources. In step 134, the data is normalized. For example, the resource management system 102 may take in data (e.g., from the database 114) that does not follow a particular standard and normalize the data to a standard defined within the resource management system 102. The resource management system 102 may accomplish this in various ways, such as using an automated interface that converts the CAD system data format to a data format of the resource management system 102. The normalized data may then be stored for later analysis. In step 136, the data is processed to achieve desired results, as will be described below in greater detail with respect to performance evaluation, schedule building, and other actions. In step 138, results of the processing may be delivered to end users via display, email, and/or other means.

Figure 1C:
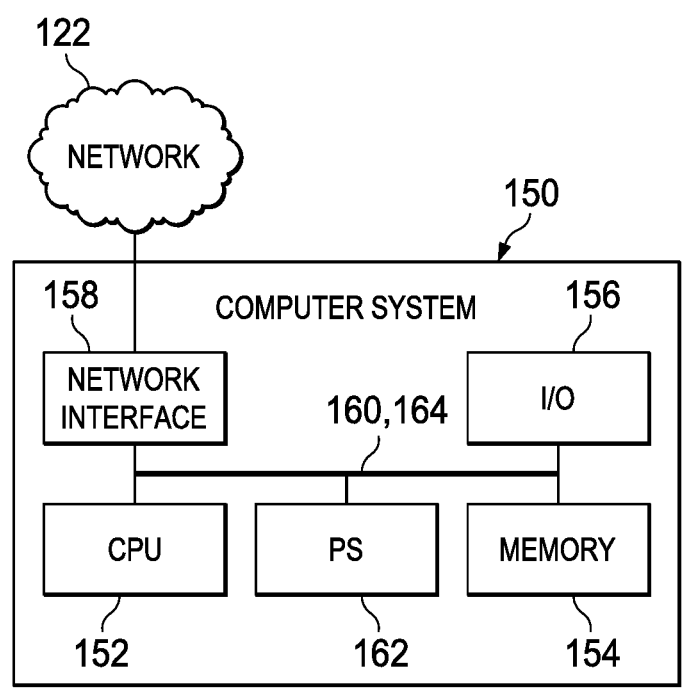
FIG. 1C illustrates one embodiment of a computer system that may be used within the environment of FIG. 1A.

Referring to FIG. 1C, one embodiment of a computer system 150 is illustrated. The computer system 150 is one possible example of a system component or device that may be used as part of the resource management system 102 of FIG. 1A and/or to interact or otherwise communicate with the resource management system 102. The computer system 150 may include a controller (e.g., a central processing unit ("CPU")) 152, a memory unit 154, an input/output ("I/O") device 156, and a network interface 158. The components 152, 154, 156, and 158 are interconnected by a transport system (e.g., a bus) 160. A power supply (PS) 162 may provide power to components of the computer system 150 via a power transport system 164 (shown with data transport system 160, although the power and data transport systems may be separate).

It is understood that the computer system 150 may be differently configured and that each of the listed components may actually represent several different components. For example, the CPU 152 may actually represent a multiprocessor or a distributed processing system; the memory unit 154 may include different levels of cache memory, main memory, hard disks, and remote storage locations; the I/O device 156 may include monitors, keyboards, and the like; and the network interface 158 may include one or more network cards providing one or more wired and/or wireless connections to the network 112. Therefore, a wide range of flexibility is anticipated in the configuration of the computer system 150, which may range from a single physical platform configured primarily for a single user to a distributed platform such as a cloud computing system.

The computer system 150 may use any operating system (or multiple operating systems), including various versions of operating systems provided by Microsoft (such as WINDOWS), Apple (such as Mac OS X), UNIX, and LINUX, and may include operating systems specifically developed for handheld devices, personal computers, and servers depending on the use of the computer system 150. The operating system, as well as other instructions, may be stored in the memory unit 154 and executed by the processor 152. For example, the memory unit 154 may include instructions for performing some or all of the methods and/or for providing the display screens described herein.

The network 122 may be a single network or may represent multiple networks, including networks of different types. For example, the network 122 may include one or more cellular links, data packet networks such as the Internet, local area networks (LANs), and/or wide local area networks (WLAN), and/or Public Switched Telephone Networks (PSTNs). Accordingly, many different network types and configurations may be used to couple the resource management system 102 to other components of the environment 100.

Figure 2A:
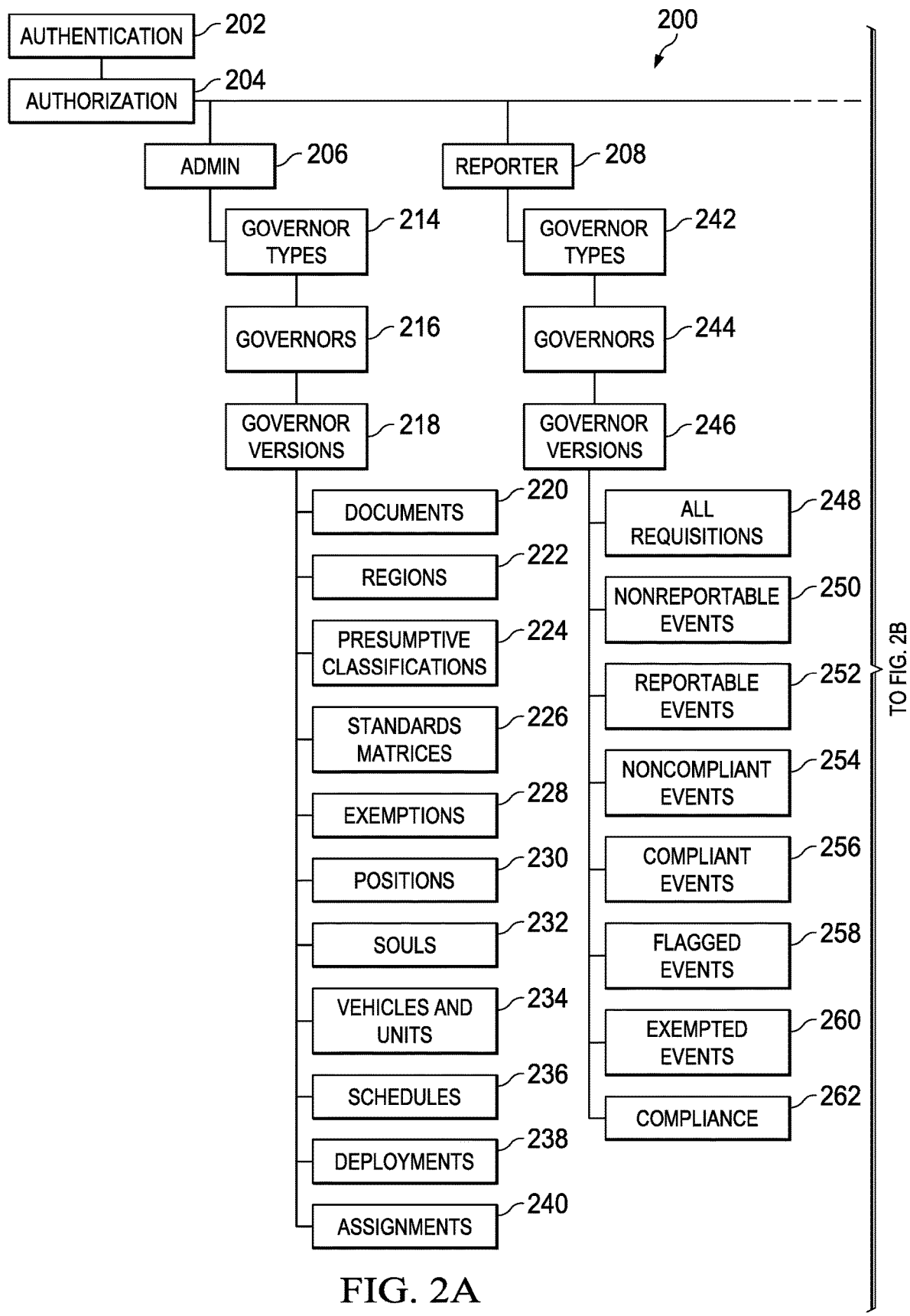
FIGS. 2A and 2B illustrate one embodiment of an application map that may be used with the resource management system of FIG. 1A.
Figure 2B:
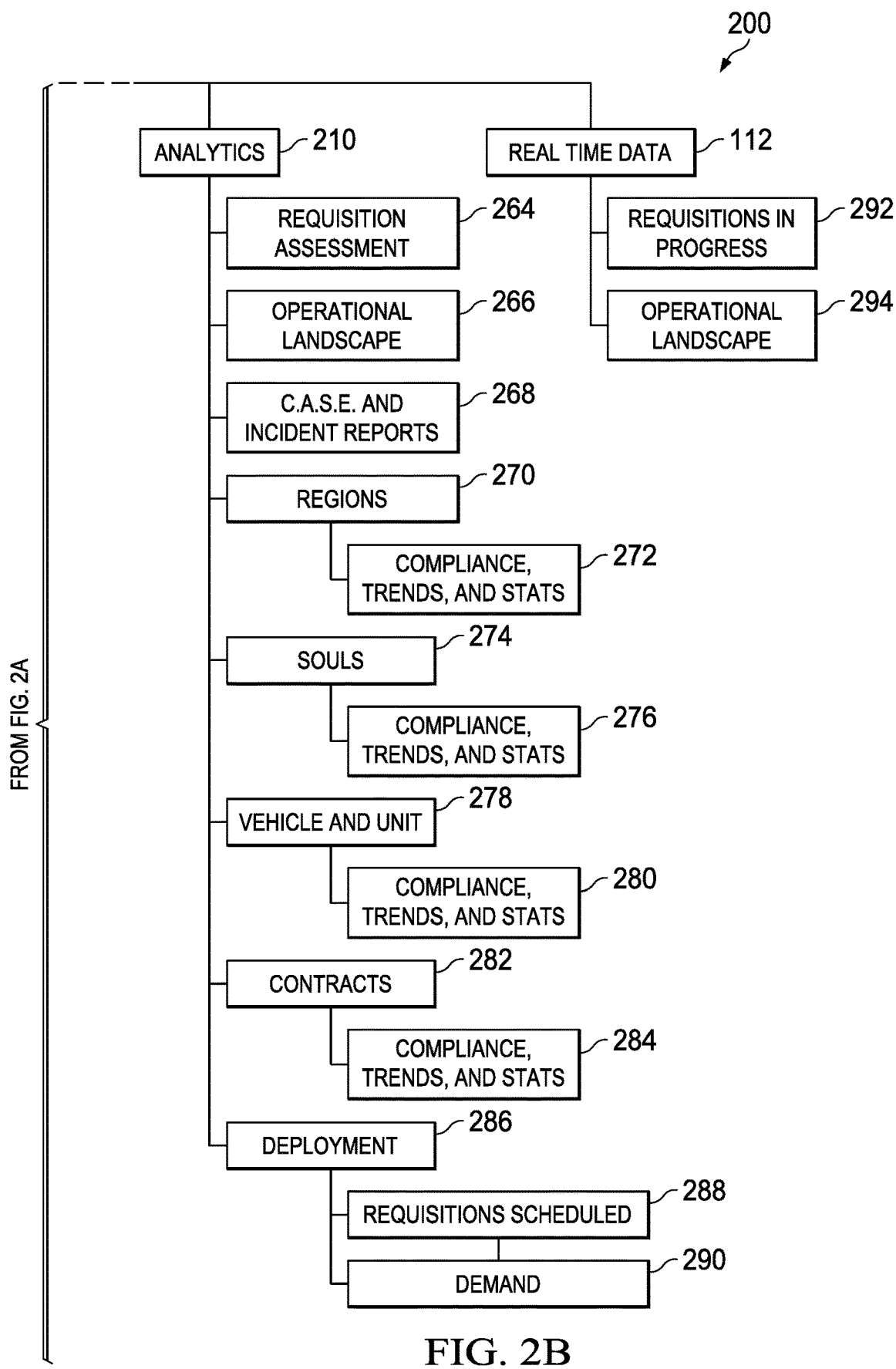

Referring to FIGS. 2A and 2B, an application map 200 illustrates one example of a structural hierarchy that may be used within the resource management system 102 of FIG. 1A, such as for software that provides functionality described herein. The application map 200 provides a hierarchy of components such as modules, filters, and functions extending from an application root. It is understood that the application map 200 is for purposes of example only and that many different structures and/or components may be used to provide the described functionality. Furthermore, some components may be omitted, other components may be added, currently illustrated components may be divided and/or combined, and/or some or all components may be distributed (e.g., in a cloud computing environment). Accordingly, the functionality described with respect to the application map 200 may be rearranged and modified in many different ways.

The application root includes an authentication process 202 and an authorization process 204, which must be satisfied to access modules of the hierarchical structure. The modules include an administration module 206, a reporter module 208, an analytics module 210, and a real time data module 212. The administration module 206 enables a user to manage (e.g., add and/or modify) information within the resource management system 102. For example, contracts, standards used for compliance, personnel, vehicles, and any other information may be added using a particular function of the administration module 206. The reporter module 208 provides various reports corresponding to the provided functions and is generally directed to overview reports that contained information compiled from multiple occurrences. The analytical module 210 provides various analyses that may form the basis of the reports for the reporter module 208 and may provide more individualized information that the reporter module 208. The real time data module 212 provides access to certain information in real time.

The administration module 206 includes filters for governor types 214, governors 216, and governor versions 218, which may be used to filter information accessed by functions of the administration module 206. The functions of the administration module 206 include functions for providing information corresponding to documents 220, regions 222, presumptive classifications 224, standards matrices 226, exemptions 228, positions 230, souls 232, vehicles and units 234, schedules 236, deployments 238, and assignments 240.

Documents 220 provides governing paperwork, such as a contract or an employee handbook, that may be embedded directly in a browser or otherwise provided to a user. Regions 222 defines areas where the governing paperwork is valid. Presumptive classifications 224 defines different types of requisitions regulated by the governing paperwork and may be correlated with severity. Standards matrices 226 may include every combination of regions, presumptive classifications, and the associated standard as defined in the governing paperwork. Exemptions 228 includes questions to be asked when determining if an event qualifies for a specific exemption if allowed by the governing documents. Positions 230 includes positions associated with the selected agency. Souls 232 includes the people associated with the selected agency. Vehicles and units 234 includes the vehicles and units associated with the selected agency. Schedules 236 includes schedules associated with the selected agency. Deployments 238 is directed to the method for positioning resources associated with the selected agency. Assignments 240 identifies the relationship between different resources (e.g., a soul may be assigned to one or more positions and a vehicle in a schedule).

The reporter module 208 includes filters for governor types 242, governors 244, and governor versions 246, which may be used to filter information accessed by functions of the reporter module 208. The functions of the reporter module 208 include functions for providing information corresponding to all requisitions 248, nonreportable events 250, reportable events 252, noncompliant events 254, compliant events 256, flagged events 258, exempted events 260, and compliance 262.

Requisitions 248 provides a list of requisitions that are in any way related to the current governor version. Nonreportable events 250 provides a list of complex events that require multiple pieces of information where some, but not all, information is available. Reportable events 252 provides a list of events where all of the required information is available. This may be referred to collectively as the "bucket." Noncompliant events 254 provides a list of events that failed to meet a stated standard. Compliant events 256 provides a list of events that meet a stated standard. Flagged events 258 provides a list of events that, at some point, failed to meet a standard, and then some information was changed such that the standard was met. Exempted events 260 provides a list of events that have been approved for an exemption from the stated standard. Compliance 262 provides the percentage of events that met the standard versus the number of reportable events.

The analytics module 210 includes functions for requisition assessment 264, operational landscape 266, and C.A.S.E and incident reports 268. The requisition assessment 264 provides details specific to a single requisition in one place and includes a timeline showing how the requisition was configured at any point. Assessments may occur for each change in the configuration of the requisition. The operational landscape 266 may be configured in different ways, but contains four pieces for purposes of example. The first piece is a system level view of one or more events, and includes a four dimensional map with all resources and their missions. The second piece is a two dimensional map with one selected resource and its actual travel route and suggested route. The third piece is a street level view of what the selected resource would have seen while driving. The fourth piece is a chart of the system wide activity and/or demand. C.A.S.E and incident reports 268 include Call Accountability of Service Expectations (C.A.S.E.), which includes a form filled out by relevant personnel to aid in non-compliant investigations and may include exemption questions from exemptions 228.

The analytics module also includes filters for regions 270, souls 274, vehicle and unit 278, contracts 282, and deployment 286. The region filter 270 leads to a function for compliance, trends, and statistics 272, the souls filter 274 leads to a function for compliance, trends, and statistics 276, the vehicle and unit filter 278 leads to a function for compliance, trends, and statistics 280, and the contracts filter 282 leads to a function for compliance, trends, and statistics 284. It is understood that functions 272, 276, 280, and 284 may be a single function but are shown separately herein to clarify their association with each filter. Compliance indicates the percentage of time the standards are met as filtered by region, soul, contract, vehicle, and/or unit. Trends returns compliance and other performance indication measurements plotted over time, thereby revealing an overall trend. Statistics provides an assortment of tools used to find, investigate, and fix different issues facing the selected agency. The deployment filter 286 leads to functions for requisitions scheduled 288 and demand 290. This provides the geographic and time based demand plus the known scheduled activity for a given period of time. The primary purpose is to aid a user in deciding where and when to use resources.

The real time data module 212 includes functions for requisitions in progress 292 and an operational landscape 294. The requisitions in progress 292 provides a list of current requisitions in progress and the scheduled requisitions within a given time frame. The operational landscape provides information similar to that of operational landscape 266, but in real time.

Figure 3:
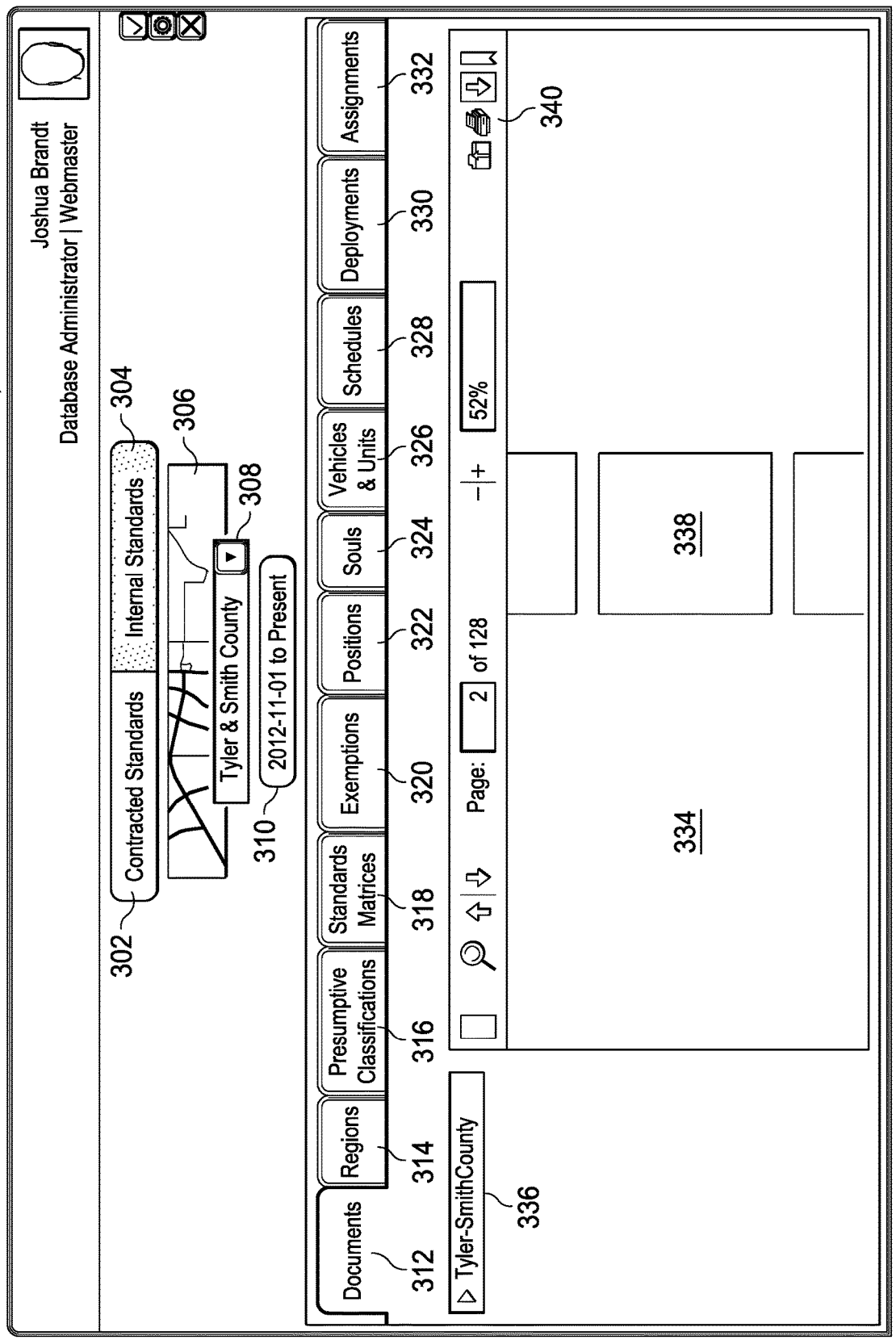
FIG. 3 illustrates one embodiment of a display screen that may be provided by the resource management system of FIG. 1A.

Referring to FIG. 3, one embodiment of a display screen 300 is illustrated. The screen 300 may be provided by the resource management system 102 to enable a user to navigate, view, store, and retrieve information within the resource management system 102. For example, the screen 300 may be provided to a user via the interface 104 in a format compatible with a web browser, such as HyperText Markup Language (HTML) and/or Extensible Markup Language (XML). In the present example, the screen 300 includes various features including user selectable items and viewable areas. It is understood that the screen 300 is only one example of many possible screen configurations, and that other embodiments may be arranged differently, may have more or fewer features, and/or may display more or less information. Furthermore, it is understood that the actual types of user selectable items (e.g., buttons, tabs, drop down menus, scroll bars, time sliders, zoom controls, and play/reverse/forward controls) may vary and are not limited to those illustrated in FIG. 3.

Although not shown, a user may be presented with one or more screens prior to the screen 300, such as an authentication screen and/or another menu screen. For example, on the authentication screen, the user may be required to enter authentication information, such as a user name and a password. The authentication process may identify the user's permissions within the resource management system 102, such as whether the user has permission to view and/or modify particular information. Once authenticated by the resource management system 102, the user may be shown screen 300 or another screen, such as a menu screen that allows the user to select an agency and whether contracted standards or internal standards are to be displayed. For example, if multiple agencies are available, the user may select the particular agency for which information is to be viewed and the appropriate standards will be applied for that agency as selected.

The user may then make other selections, such as one of the administration module 206, the reporter module 208, the analytics module 210, or the real time data module 212. Each module may be presented as a tab, a button, or another selectable component. Functionality that is not accessible to this particular user may be indicated as inaccessible (e.g., grayed out) or may simply not respond when selected by the user. It is assumed for purposes of example that the user selected the administration module 206 to arrive at the screen 300, which is an illustration of one possible screen for the administration module 206. It is understood that the administration module 206 may be used to enter, edit, and/or delete information that is used by the reporter module 208, the analytics module 210, and the real time data module 212.

The items on the screen 300 include an indicator 302 corresponding to contracted standards (currently selected) and an indicator 304 corresponding to internal standards. Contracted standards may include requirements related to contracts between the selected agency (e.g., a company that provides ambulance services to a city and/or county) and customers. For example, the City of Tyler, Tex., may be a customer and any agreed upon standards between the selected agency and the City of Tyler may be found in the resource management system 102 by selecting the button 302. Internal standards may include regulations, rules, and other operating specifications internal to the selected agency. In some embodiments, the indicators 302 and 304 may be buttons to allow a user to select one of the standards types from the screen 300.

A map region 306 may display a portion of a map corresponding to a location selected by drop down menu 308. Field 310 may indicate a date and/or range of dates currently being used to filter information provided via one or more tabs 312-332. The tabs 312-332 include a Documents tab 312 corresponding to documents function 220 (FIGS. 2A and 2B), a Regions tab 314 corresponding to regions function 222, a Presumptive Classifications tab 316 corresponding to presumptive classifications function 224, a Standards Matrices tab 318 corresponding to standards matrices function 226, an Exemptions tab 320 corresponding to exemptions function 228, a Positions tab 322 corresponding to positions function 230, a Souls tab 324 corresponding to souls functions 232, a Vehicles and Units tab 326 corresponding to vehicles and units function 234, a Schedules tab 328 corresponding to schedules function 236, a Deployments tab 330 corresponding to deployments function 238, and an Assignments tab 332 corresponding to assignments function 240. It is understood that the tabs 312-332 are for purposes of example only and that more or fewer tabs may be present in a particular embodiment, and tabs may be linked to different information than shown in FIG. 3.

As a particular tab 312-332 is selected, corresponding information may be displayed in a region 334. A user selectable item 336 may be provided to indicate that the material being currently displayed in region 334 is for a particular area (e.g., Tyler-Smith County) and/or may be used to select other options (if available). For example, the Documents tab 312 is currently selected and a document 338 is being displayed. The document 338 corresponds to Tyler-Smith County and may be a contract, a requirements list, and/or any other document type that may be associated with Tyler-Smith County and present in the resource management system 102. One or more controls 340 may be present to provide user selectable viewing options for the document 338.

Figure 4:
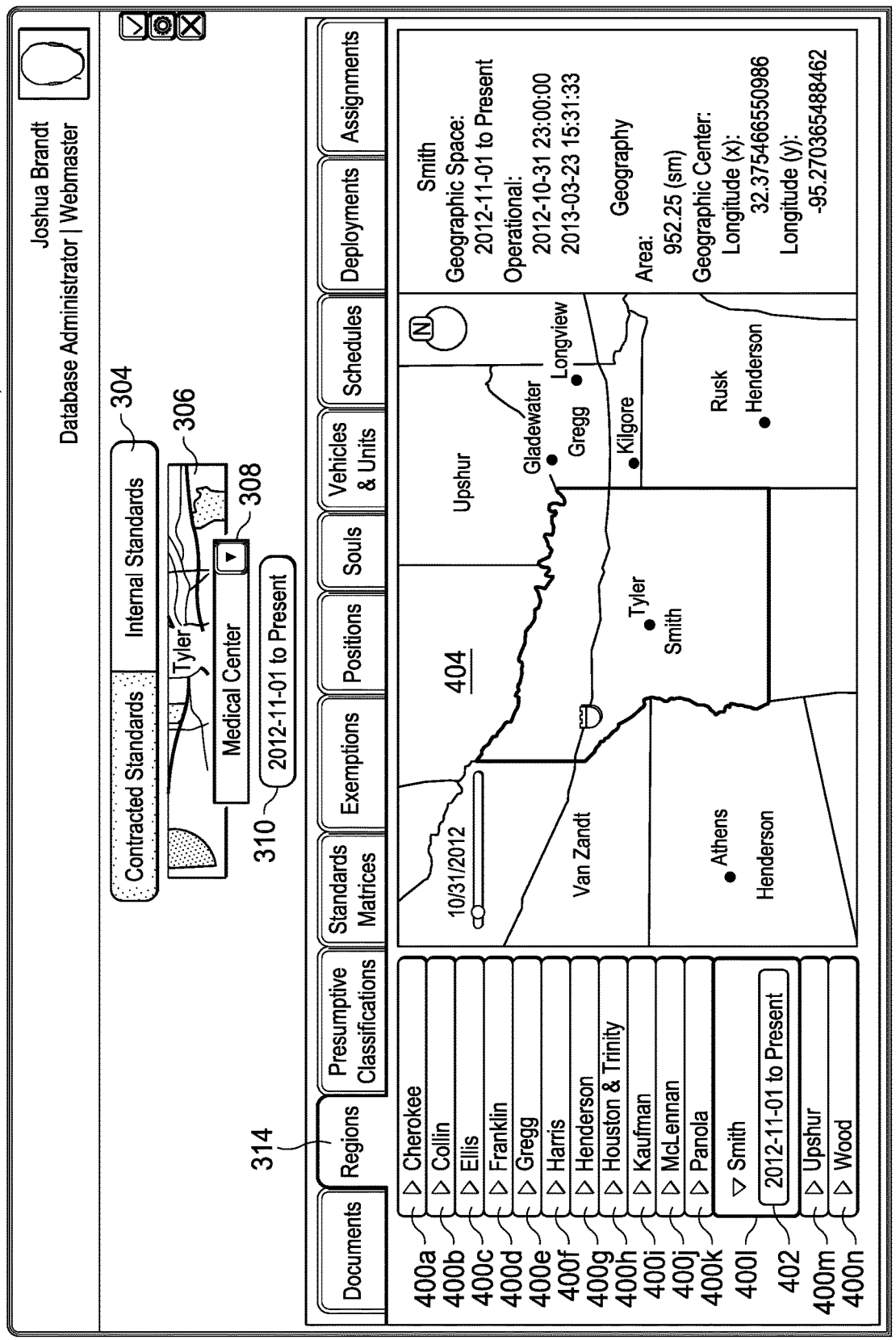
FIG. 4 illustrates another embodiment of the screen of FIG. 3 displaying a region map.

Referring to FIG. 4, one embodiment of the screen 300 of FIG. 3 is illustrated with the Regions tab 314 selected. Under the Regions tab 314, multiple areas 400a-400n are available for selection. In the present example, the areas correspond to counties in which the service provider has resources, with 400a corresponding to Cherokee County, 400b corresponding to Collin County, 400c corresponding to Ellis County, 400d corresponding to Franklin County, 400e corresponding to Gregg County, 400f corresponding to Harris County, 400g corresponding to Henderson County, 400h corresponding to Houston and Trinity County, 400i corresponding to Kaufman County, 400j corresponding to McLennan County, 400k corresponding to Panola County, 400l corresponding to Smith County, 400m corresponding to Upshur County, and 400n corresponding to Wood County.

The current selection is area 400l, which is Smith County. Under the current selection of area 400l, a start date and an end date are displayed to indicate a time frame 402 for which records and/or other information are available. The time frame 402 may be modified to change the start date and/or end date, which will modify the available information (assuming more information is available if the time frame is expanded). A default time frame may be set, such as a start date that captures all available information for that area to the current date.

The current selection of area 400l is reflected in region 334 of the screen 300 with map 404 showing Smith County, Tex. The drop down menu 308 may now display options available in Smith County, such as a Medical Center. Although not shown, it is understood that the drop down menu 400l may display raw or filtered options (e.g., all locations available to the resource management system 102 for Smith County for the selected agency or a sub-list of those options based on one or more defined criteria).

The map 404 may be a third-party map obtained via map services such as Google Earth/Google Maps (provided by Google Inc. of Mountain View, Calif.), Bing Maps (provided by Microsoft Corporation, Redmond, Wash.), Yahoo Maps (provided by Yahoo! Inc. of Sunnyvale, Calif.), and/or other publicly available or proprietary mapping systems. The resource management system 102 may access such maps via one or more application programming interfaces (APIs) made available for such access. For example, the resource management system 102 may access Google Maps using Google Maps APIs provided by Google Inc.

Referring again to FIG. 3, the Presumptive Classifications tab 316 corresponds to presumptive classifications 224 (FIGS. 2A and 2B), which defines different types of requisitions regulated by the governing paperwork and may be correlated with severity. The definitions may provide a priority level to a particular requisition. One of the priority levels may be assigned to each call received by the CAD system 110 to which a resource unit (e.g., an ambulance)) has been assigned. For example, there may be multiple levels of priorities (e.g., Priority 1, Priority 2, . . . Priority N), and each level of priority may have corresponding classes and codes.

For purposes of illustration, Priority 1 may include a class entitled Abdominal Problems, and that class may include various codes such as 01D00=Override and 01D01=Not Alert. In another example, a class Allergies (Reactions)/Envenomation (Stings, Bites) may include various codes such as 02D01=Severe Respiratory Distress, 02D02=Not Alert, 02D03=Condition Worsening, 02D04=Swarming Attack (Bee, Wasp, Hornet), and 02E01=Ineffective Breathing. As is known, there may be many different priority levels, classes, and codes, and such information may vary due to differing operators, CAD systems, geographic areas, governmental requirements, and/or other reasons. One example of such a priority system is the Medical Priority Dispatch System (MPDS), which is designed and licensed by Priority Dispatch Corporation of Salt Lake City, Utah. Similar systems that may be used with the resource management system 102 include the Fire Priority Dispatch System (FPDS) and the Police Priority Dispatch System (PPDS), also provided by Priority Dispatch Corporation. Accordingly, it is understood that the Presumptive Classifications tab 316 may provide such information regardless of the format and organization of such information.

With continued reference to FIG. 3, the Standards Matrices tab 318 corresponds to the standards matrices 226 (FIGS. 2A and 2B), which includes some or all combinations of regions, presumptive classifications, and associated standards as defined in the governing paperwork. A particular matrix may change depending on contracted standards, internal standards, type of resource (e.g., an ambulance may have different matrices than another emergency resource such as a police or fire vehicle).

For purposes of illustration, the matrices refer to an ambulance, with a different matrix for chute time, response time, scene time, and drop time. The chute time is the amount of time it takes for the ambulance to go en route after being assigned to a requisition (e.g., en route time minus assignment time). The response time is the time between the pickup time and at scene time (e.g., on scene time minus pick up time). The scene time is the amount of time spent on scene (e.g., time transport begins minus at scene time). The drop time is the time that it takes for the ambulance to return to unassigned status following arrival at the destination (e.g., unassigned time minus at destination time). It is understood that times may be calculated differently in some embodiments depending on how such times are defined in contracted and/or internal standards.

Each matrix may be selectable to display a desired matrix in region 334 of the screen 300. One example of a partial matrix is illustrated below as Table 1 for chute times for areas 400a-400e and priorities 1-5.

|  | Priority 1 | Priority 2 | Priority 3 | Priority 4 | Priority 5 |
| --- | --- | --- | --- | --- | --- |
| Area 400a | Assigned 00:00:30 En Route | Assigned 00:00:30 En Route | Assigned 00:00:30 En Route | Assigned 00:00:30 En Route | Assigned 00:00:30 En Route |
| Area 400b | Assigned 00:00:30 En Route | Assigned 00:00:30 En Route | Assigned 00:00:30 En Route | Assigned 00:00:30 En Route | Assigned 00:00:30 En Route |
| Area 400c | Assigned 00:00:30 En Route | Assigned 00:00:30 En Route | Assigned 00:00:30 En Route | Assigned 00:00:30 En Route | Assigned 00:00:30 En Route |
| Area 400d | Assigned 00:00:30 En Route | Assigned 00:00:30 En Route | Assigned 00:00:45 En Route | Assigned 00:00:45 En Route | Assigned 00:00:45 En Route |
| Area 400e | Assigned 00:00:30 En Route | Assigned 00:00:30 En Route | Assigned 00:00:45 En Route | Assigned 00:00:45 En Route | Assigned 00:01:00 En Route |

In the above example, areas 400a-400c all have thirty second chute times for priorities 1-5. Area 400d has thirty second chute times for priorities 1 and 2 calls, and forty-five seconds for priorities 3-5. Area 400e has thirty second chute times for priorities 1 and 2 calls, forty-five seconds for priorities 3 and 4, and one minute for priority 5. It is understood that these times may not reflect the actual times for a particular region, but may be modified for purposes of illustration.

The Exemptions tab 320 corresponds to exemptions 228, which includes questions to be asked when determining if an event qualifies for a specific exemption if allowed by the governing documents. For example, some cities, counties, and/or other entities may allow exceptions to the standards matrices for bad weather. Accordingly, the Exceptions tab 320 provides one or more questions and/or criteria to enable a user to determine whether an exception applies. For example, there may be an inclement weather exception covering weather conditions that prohibit full speed operations, such as when snow or ice make it impossible for an ambulance to safely travel to a given destination at full speed. Accordingly, the Exemptions tab 320 may present such questions as, "Were there any National Weather Service advisories in effect (along the response route) while responding to this incident? Regardless of the weather conditions, was the responding unit able to respond at the typical maximum speed?" Each exception may have specific questions to aid the user in making a correct determination. It is understood that the Exemptions tab 320 may not actually present the questions to a user, but may list available questions and allow such questions to be entered, edited, and/or deleted.

If an exception is applicable, failure to meet a specified time may be excused. This may be particularly important when a certain number of requisitions must meet the specified times, since an applicable exception may mean that a particular requisition does not count against the number of satisfactory requisitions even though it may have failed to meet one or more time requirements. It is understood that an exception may be directed to a particular time, but not other times. For example, snow may provide an exception for response time, but not for chute time.

The Positions tab 322 corresponds to positions 230 (FIGS. 2A and 2B), which include various organizational roles (e.g., Call Processor, Regional Director, and others) within the selected agency.

The Souls tab 324 corresponds to souls 232 (FIGS. 2A and 2B), which include personnel associated with the selected agency.

The Vehicles and Units tab 326 corresponds to vehicles and units 234 (FIGS. 2A and 2B), which include various mobile resources and corresponding information associated with the selected agency. The information may include status (e.g., in service, available, being repaired), equipment (e.g., what equipment a particular vehicle is carrying), current location, assigned location, and/or any other information entered into the resource management system 102.

Figure 5:
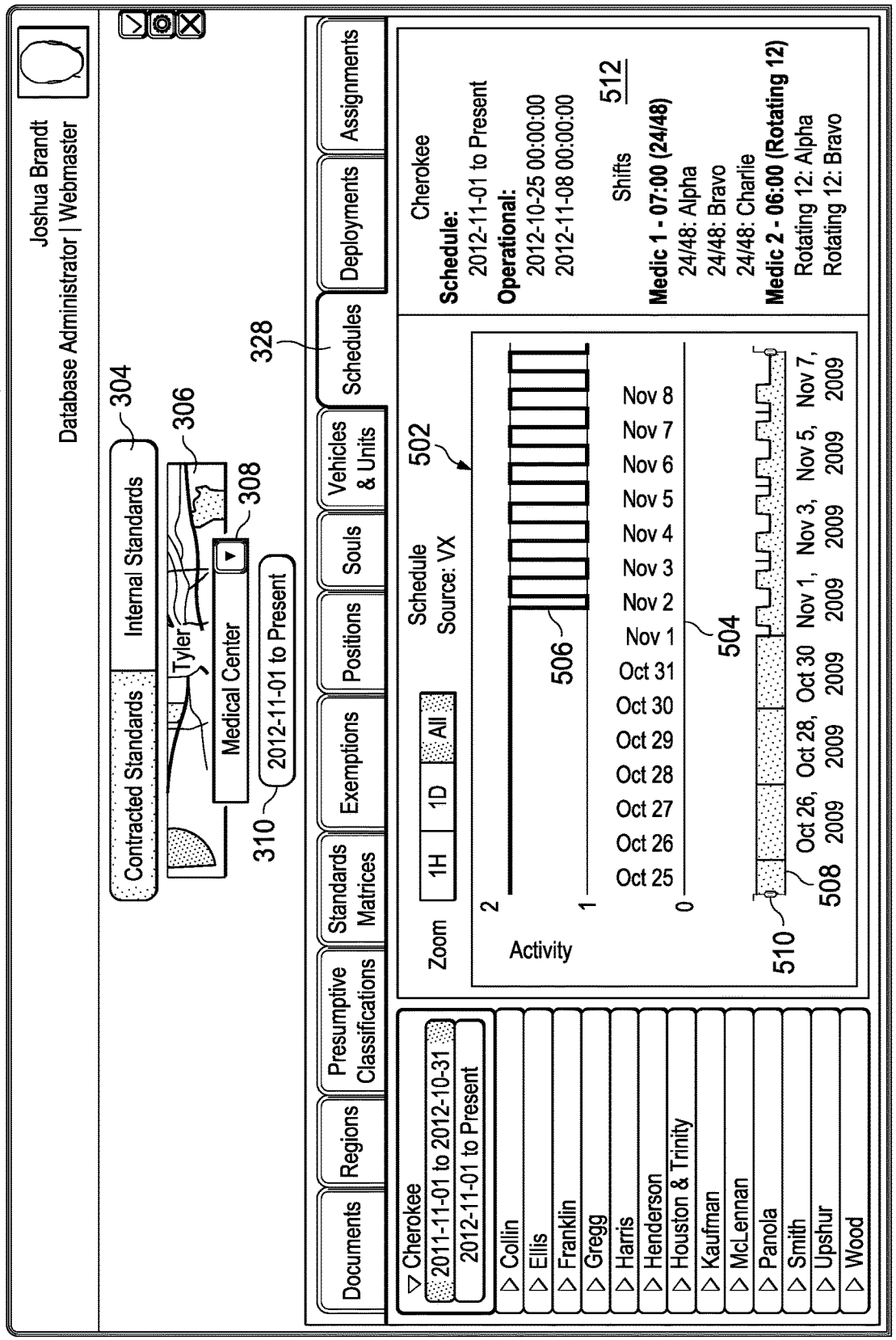
FIG. 5 illustrates another embodiment of the screen of FIG. 3 displaying a schedule.

Referring to FIG. 5, one embodiment of the screen 300 of FIG. 3 is illustrated with the Schedules tab 328 selected. Under the Schedules tab 328, which corresponds to schedules 236 (FIGS. 2A and 2B), a schedule for the selected agency indicating current resource allocation plans for a specified time period may be displayed for an area 400a-400n. In the present example, area 400a has been selected and a corresponding schedule 500 is being displayed in region 334. The schedule 500 includes a y-axis 502 representing a number of scheduled units and an x-axis 504 representing time. A schedule line 506 charts the number of units for a particular time. The schedule 500 may be viewed at different levels of resolution, such as increments based on minutes, hours, days, weeks, months, or years.

A time line 508, which may be combined with the x-axis 504 in some embodiments, provides another view of the schedule 500. A time slider 510 may be moved along the time line 508 to identify particular times along the x-axis 504. More detailed information about the schedule 500 at the position of the time slider 510 may be provided via a text box 512, although it is understood that pop-up boxes and/or other information display mechanisms may be used in addition to or in place of the text box 512.

The time slider 510 is currently positioned at October 25. As can be seen by schedule line 506, there are two units available at all times on this day. Details are provided by text box 512, which shows that shift Medic 1 is based on a 7:00 AM start time and operates on a 24/48 schedule (e.g., twenty-four hours on and forty-eight hours off). Three units Alpha, Bravo, and Charlie are assigned to cover this shift. Shift Medic 2 is based on a 6:00 AM start time and operates on a rotating 12 schedule (e.g., twelve hours on and twelve hours off). Two units Alpha and Bravo (not the same as those on Medic 1) are assigned to cover this shift. Accordingly, by zooming in and out on the schedule 500 and by sliding the time slider 510 along time line 508, a user can easily view the allocation of resources and corresponding details for a particular point in time.

Figure 6:
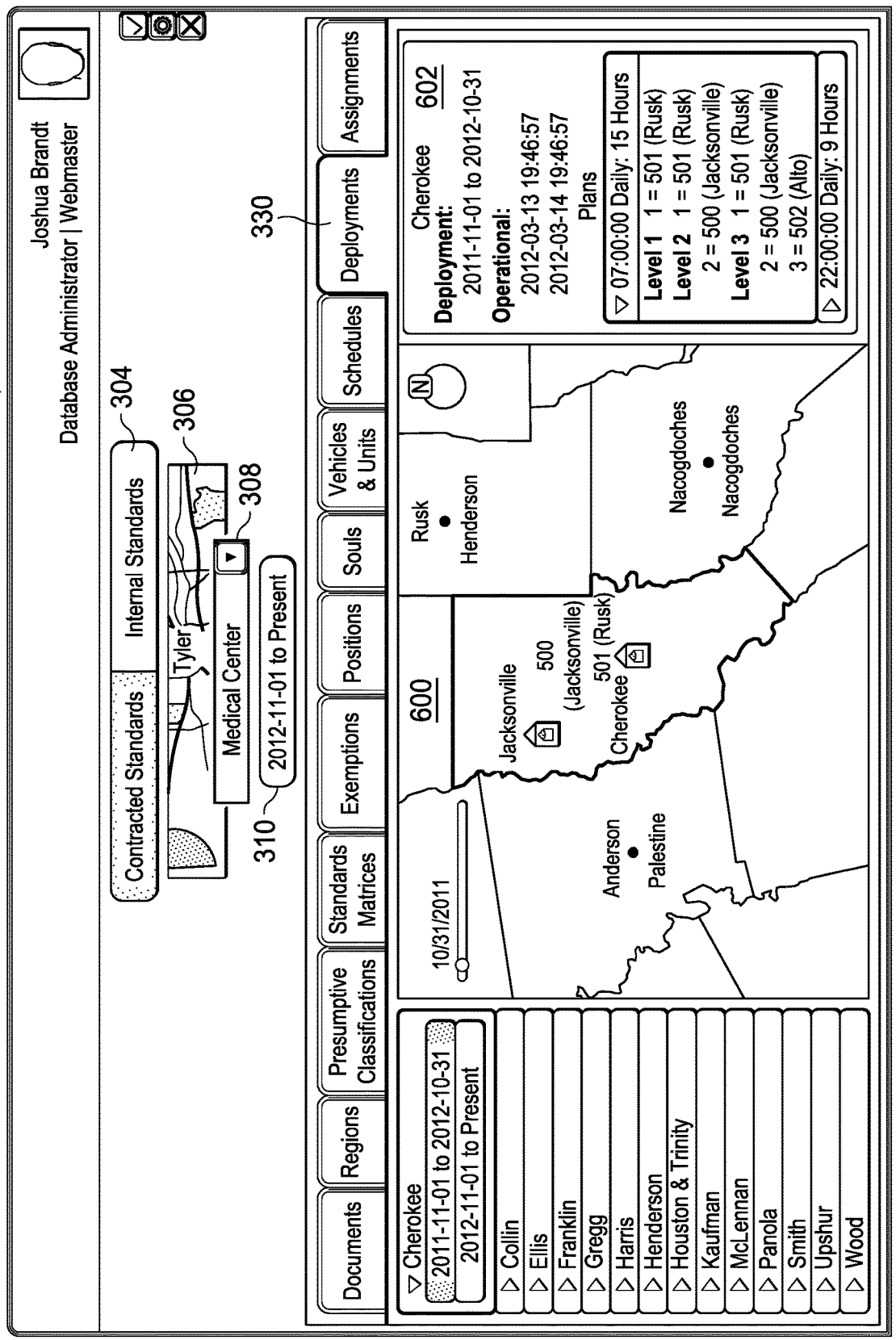
FIG. 6 illustrates another embodiment of the screen of FIG. 3 displaying a deployment map.

Referring to FIG. 6, one embodiment of the screen 300 of FIG. 3 is illustrated with the Deployments tab 330 selected. Area 400a is currently selected. Under the Deployments tab 330, which corresponds to deployments 238 (FIGS. 2A and 2B), a map 600 illustrates the location of resources based on a particular deployment plan. Multiple plans may be viewable with different deployment levels. For example, a text box 602 provides information relating to a day plan with three different levels. A night plan is described below with three different levels, but is collapsed and not shown in FIG. 6. It is understood that pop-up boxes and/or other information display mechanisms may be used in addition to or in place of the text box 602. In some embodiments, a time line and a time slider (not shown) may be used to select different times in the deployment plan and the map 600 may reflect deployment changes corresponding to the selected times in a manner similar to that described for the schedule 500 of FIG. 5.

In the present example, one of the three day plans runs from 7:00 to 21:59, and one of the three night plans from 22:00 to 6:59. The day plans have from one to three shifts with each plan identifying the location of the resources for that particular deployment. Accordingly, day plan level 1 deploys one unit to post 501 in Rusk. Day plan level 2 deploys two units to post 501 in Rusk and post 500 in Jacksonville. Day plan level 3 deploys three units to post 501 in Rusk, post 500 in Jacksonville, and post 502 in Alto (not shown). Map 600 illustrates day plan level 2.

The night plans have either two or three shifts with each plan identifying the location of the resources for that particular deployment. Accordingly, night plan level 1 deploys to Rusk. Night plan level 2 deploys two units to post 501 in Rusk and post 500 in Jacksonville. Night plan level 3 deploys three units to post 501 in Rusk, post 500 in Jacksonville, and post 502 in Alto (not shown).

Referring again to FIG. 3, the Assignments tab 332 corresponds to assignments 240, which identifies the relationship between different resources (e.g., a soul may be assigned to one or more positions and a vehicle in a schedule).

Figure 7A:
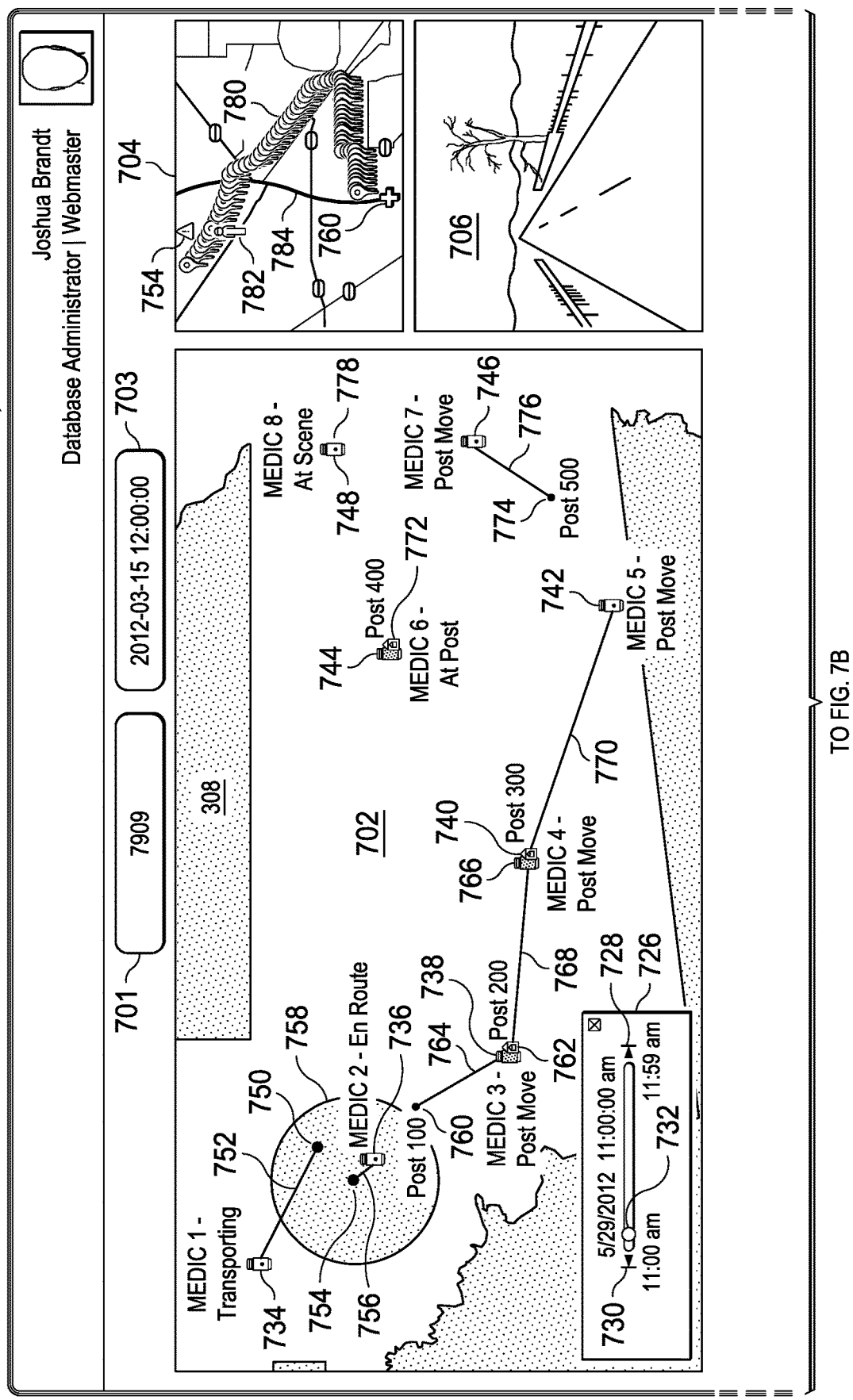

Referring to FIGS. 7A and 7B, one embodiment of a screen 700 illustrates information for an operational landscape, which corresponds to the operational landscape 266 (in analytics module 210 of FIGS. 2A and 2B) and the operational landscape 294 (in real time data module 294 of FIGS. 2A and 2B). The screen 700 includes three separate map views 702, 704, and 706 and a chart 708, which correspond to the previously described four pieces that may be provided by an operational landscape. Accordingly, the map view 702 corresponds to the system level view of one or more events and includes a four dimensional map with all resources and their missions. The map view 704 corresponds to the two dimensional map with one selected resource and its actual travel route and suggested route. The map view 706 corresponds to the street level view of what the resource would have seen while driving. The chart 708 corresponds to the chart of the system wide activity and/or demand. Selecting any one of the three map views 702, 704, and 706 and performing an action (e.g., zooming, moving, and/or turning) may update the other two map views to maintain their synchronization. Selecting a time on the chart 708 may update the events and locations on the map views 702, 704, and 706.

The map view 702 is centered on a selected region and moving the map a sufficient amount may re-center the map on another region. In the present embodiment, the chart 708 only contains information for the currently selected region. Accordingly, if the map is moved such that a new region is selected, a new chart 708 may be loaded for the newly selected region. This enables a user to move around the map and see related demand information.

The chart 708 has a y-axis 710 representing a number of active units (e.g., units with an active requisition) and an x-axis 712 representing time. A chart line 714 charts the number of active units against time. In the current example, the time represents 00:00:01 AM to 23:00:00 on May 29. A second timeline 716 may be used to zoom in and out on the timeline 712 by moving a start time slider 718 and an end time slider 720 along timeline 716. Accordingly, in some embodiments, the timeline 716 may provide a view of demand before and/or after the time shown by the x-axis 712 depending on the locations of the time sliders 718 and 720 that define the time represented by x-axis 712.

Another time slider 722 may be used to select a point along the x-axis 712 for additional information. For example, the time slider 722 is illustrated at a point representing 11:00:00 on x-axis 712. At this time, as illustrated in pop-up box 724, there were two active requisitions #7909 and #7899 and two units Medic 2 and Medic 8, respectively, were assigned to handle those requisitions. In some embodiments, the time slider 722 may not be selectable, but may simply reflect the location of a playback controller 726. The playback controller 726 may include a play button 728, a reverse button 730, and/or one or more time sliders 732 that may be used to move manually through a period of time and to provide a visual indicator of time with respect to the playback controller 726. As the time slider 732 moves, the time slider 722 may move in a synchronized manner. It is noted that field 703 indicates the time the record was viewed in the present embodiment, although other embodiments may indicate the time the record was generated and/or other times.

The map view 702 includes mobile units 734 (Medic 1), 736 (Medic 2), 738 (Medic 3), 740 (Medic 4), 742 (Medic 5), 744 (Medic 6), 746 (Medic 7), and 748 (Medic 8). In the present example, the mobile units are ambulances, although it is understood that the map view 702 may include any type of resource that may be displayed by the resource management system 102. The ambulances may be moving or stationary, with visual indicators providing an overview of factors such as requisition priority, destination, current compliance status, and similar information. For example, requisitions may be colored red for the highest priority calls, orange for the next highest priority, green for non-emergency calls (e.g., facility transfers), white for post moves and ambulances at a post, and so on. In other embodiments, the color may indicate status of call (e.g., en route may be red, on scene may be orange, and transporting may be green).

Using colors to represent requisition priorities provides a dispatcher with visual indicators that may be used when making decisions on how to reroute ambulances when needed. For example, if an ambulance is en route for an orange priority requisition and a red priority requisition comes in, the ambulance may be rerouted to the red priority requisition if it is the closest available ambulance. However, if the ambulance is already on a red priority requisition, the ambulance may not be rerouted and another ambulance may be assigned to the requisition based on other criteria (e.g., the next closest available ambulance may be assigned).

Ambulance 734 is transporting a patient to destination 750, as indicated by line 752. Ambulance 734, destination 750, and/or line 752 may be colored with a particular color, such as green, to visually indicate the priority of the requisition. Ambulance 736 is en route to destination 754 as indicated by line 756. The requisition for ambulance 736 is a high priority emergency call (and not a facility transfer requisition) and the ambulance 736, destination 754, and line 756 are colored red. Because the requisition has a defined compliance time for response, a circle 758 (also colored red) has been drawn with the destination 754 as its origin. As the amount of time in which the ambulance 736 has to reach the destination and remain in compliance decreases, the circle 758 becomes correspondingly smaller. If the time expires and the ambulance 736 has still not reached the destination, the circle 758 may disappear and the ambulance 736 may be marked with a visual indicator, such as a red glow, to indicate that the compliance response time was not met.

The ambulance 736 responded from location 760 (Post 100). This leaves location 760 without coverage. In the present example, this lack of coverage results in a ripple effect. More specifically, ambulance 738 moves from location 762 (Post 200) to location 760 as indicated by line 764. Ambulance 738 and line 764 are colored white to indicate that a post move is underway. This leaves location 762 without coverage, so ambulance 740 moves from location 766 (Post 300) to location 762 as indicated by line 768. This leaves location 766 without coverage, so ambulance 742 moves to location 766 as indicated by line 770. In the present example, a small plus sign indicates that the post location is a location without a structure for the ambulance crew (e.g., a parking spot on the side of the road) and a five point outline indicates the post location has a structure.

Ambulance 744 is at location 774 (Post 400) and is waiting for a requisition to be assigned. Ambulance 746 is performing a post move to location 774 (Post 500) as indicated by line 776. Ambulance 748 is on scene at location 778, but was late for an orange priority call and is marked with an orange glow.

It is noted that the pop-up box 724 indicates that there are two active requisitions #7909 and #7899 being handled by Medic 2 and Medic 8, respectively. This appears to omit ambulance 734, which is also on a requisition assignment. However, as previously described, the chart 708 only contains information for the currently selected region. Although region lines are not shown on the map view 702 as illustrated, the ambulance 734 is in another region. Accordingly, while visible on the map view 702, the ambulance 734 does not show up as an active operation on chart 708.

In the present example, ambulance 736 (Medic 2) has been selected on map view 702 as reflected by the requisition number 7909 displayed in field 701. Accordingly, map views 704 and 706 provide information specific to ambulance 736. More specifically, map view 704 illustrates the actual route 780 that was taken by the ambulance 736 to reach destination 754, with a current location 782 and orientation of the ambulance 736 illustrated for the particular time of 11:00:00. The suggested route 784 is marked and may be visually compared to the actual route 780. Map view 706 illustrates what the ambulance 736 would have seen at location 782 with the given orientation.

In some embodiments, the resource management system 102 may allow the sharing of mobile resources that are not normally shared while maintaining defined levels of availability. For example, as previously described, the ambulances 734 and 736 are in different regions. For example, their posts may be on opposite sides of a county or city boundary line as defined in the governing paperwork. Such a boundary line would ordinarily restrict each ambulance's area of activity and prevent either ambulance from being dispatched across the line. In some cases, a dispatcher on one side of the line (e.g., in the region of ambulance 736) may not even be able to select and dispatch an ambulance in another region even if the other ambulance is visible on the map view 702. This theoretically ensures that a post is properly staffed with sufficient resources as only resources within that region must be handled and moved.

However, such boundary lines may negatively impact emergency services. For example, there may be a post that has five ambulances scheduled. Only two are on active requisitions and there is only a relatively small chance that more than one of the remaining three will be needed before one of the active requisitions is completed. Across a boundary line, a post region has an unusually high demand and needs additional ambulances, but none are available. In the present embodiment, the resource management system 102 may be configured to allow the post with five ambulances to configure sharing parameters. For example, the region may be configured to allow one ambulance to be shared if five or more ambulances are posted there, the post's activity level is forty percent or less, and the post's compliance level meets a required minimum level of compliance.

With respect to compliance (or any other configuration parameter), multiple levels may be set. For example, a high compliance threshold (e.g., ninety-five percent) may be set and a low compliance threshold (e.g., ninety percent) may be set. If the post's current compliance level is above the high compliance threshold, sharing may be automatically allowed. If the post's current compliance level is between the high and low compliance thresholds, the resource management system 102 may prompt a user for a sharing decision (e.g., allow or not allow based on the user's response). If the post's current compliance level is below the low compliance threshold, sharing may be automatically denied. Accordingly, by modifying various compliance thresholds and choosing whether the resource management system 102 automatically responds to requests or requires user approval, a user may configure sharing in many different ways. Additional ambulances may become available if the activity level drops, more ambulances are posted there, and/or other sharing parameters are met. Other configuration parameters may be used to control the level of sharing, the range of destinations that a shared ambulance may be directed to, and similar limitations.

Such sharing may also be performed proactively. For example, assume a post currently has few available resources and a low level of compliance. However, a nearby post has many available resources and a relatively high level of compliance. In such scenarios, sharing may be used to proactively allocate resources from the high availability region to the low availability region before the resources are actually needed by the needy region for a requisition. By temporarily moving the resources from their current deployment to the deployment in need, the needy region will be better prepared to handle incoming requisition requests, which may in turn positively affect the region's compliance level. Accordingly, using a controlled sharing process, resources may be proactively moved under certain defined conditions even when those resources are governed by another deployment plan.

In the present embodiment, one ambulance could be shared because there are five present and only two (e.g., forty percent) are busy. Accordingly, the post and/or one ambulance may be indicated as available to the next region. The post and/or ambulance may be visually marked as available by blinking, by glowing, by the appearance of text, and/or in any other way. If the sharing availability later changes and sharing is no longer allowed, any ambulances currently being shared may return to their original post after finishing the requisition to which they are currently assigned. Accordingly, mobile units may be shared with limitations intended to protect the coverage provided by the original post to its own area. In some embodiments, a dispatcher may select and release mobile units for sharing individually or as groups to account, for example, for natural disasters and other large scale emergency events that may not be accounted for by previously defined sharing parameters.

In some embodiments, the screen 700 or another screen may show trends in compliance and/or other information. For example, colored and/or directional triangles or arrows may be displayed in a region, by a mobile unit, a post, and/or associated with other visual components of the screen 700 to indicate that the associated component is in compliance (e.g., a green triangle) or not in compliance (e.g., a red triangle). The trend direction may be shown by the direction of the arrow (e.g., up for an improving trend, down for a worsening trend, or right for a steady trend). Accordingly, a visual indication of various compliance levels may be obtained simply by examining the screen 700 if the trend layer is active.

Figure 8A:
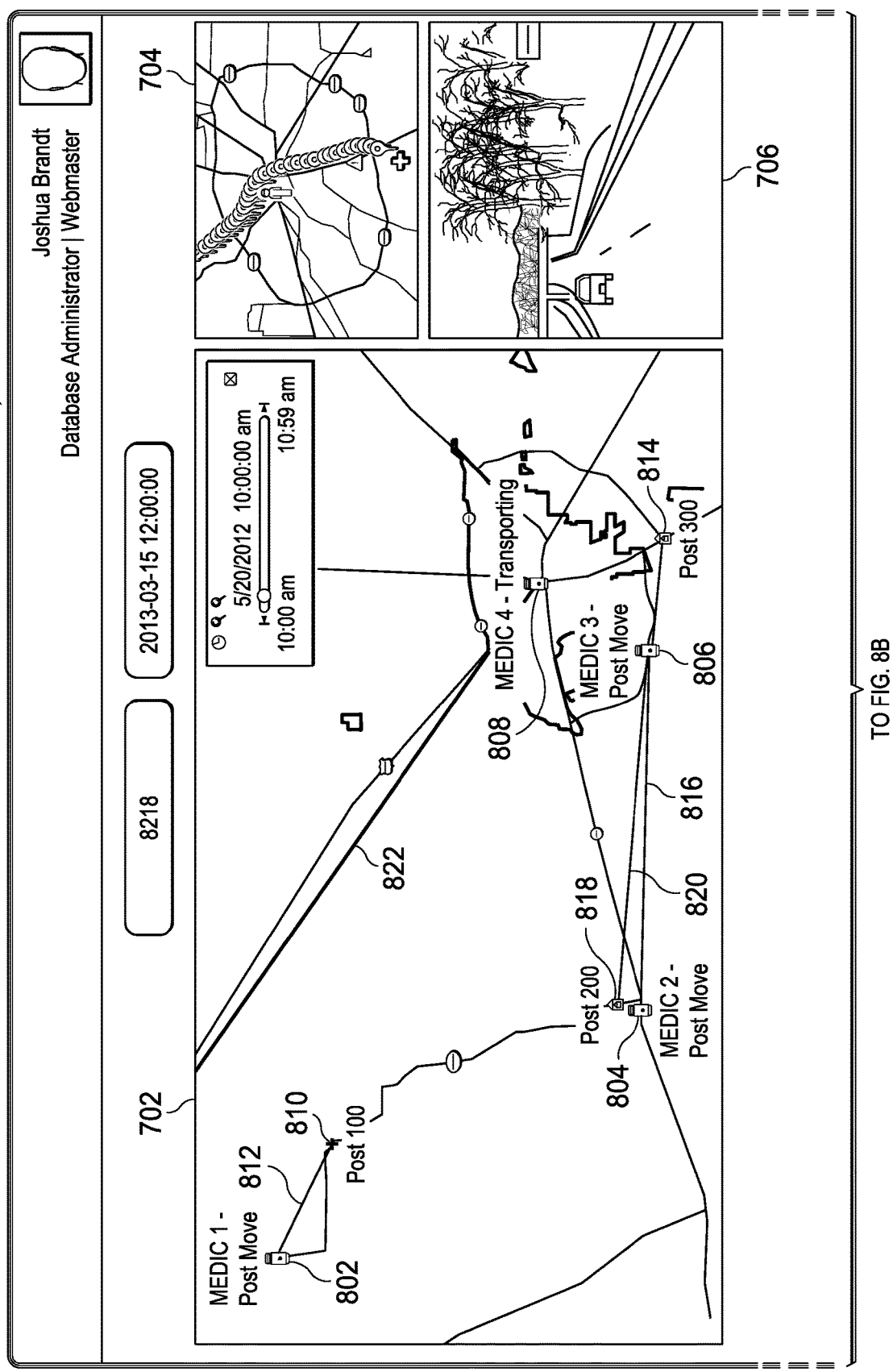

Referring to FIGS. 8A and 8B, one embodiment of a screen 800 illustrates operational landscape information similar to that described with respect to screen 700 of FIGS. 7A and 7B. Accordingly, the present description is directed more to the movement of the ambulances and does not detail each feature of the screen 800. Screen 800 includes time sliders 718 and 720, which have been moved along timeline 716. The time sliders 718 and 720 define a start time of 07:30:00 and an end time of 15:30:00. This time range is displayed as x-axis 712, illustrating how the time sliders 718 and 720 may be used to zoom in on the timeline 716, with that zoomed portion becoming the x-axis 712.

In the present example, ambulance 802 (Medic 1) is performing a post move to location 810 (Post 100) as indicated by line 812. Ambulance 808 (Medic 4) is transporting a patient to a destination (not shown) as indicated by line 822. Map views 704 and 706 reflect selected ambulance 808, which is the only active operation at the time currently being viewed.

Screen 800 illustrates a situation where two ambulances are being handled inefficiently and such inefficient handling is evident based on the visual information provided by the operational landscape of map view 702. More specifically, ambulance 804 (Medic 2) is performing a post move to location 814 (Post 300) as indicated by line 816. Ambulance 806 (Medic 3) is performing a post move to location 818 (Post 200) as indicated by line 820. However, as clearly illustrated, ambulance 804 is much closer to location 818 and ambulance 806 is much closer to location 814. In fact, as indicated by lines 816 and 820, the two ambulances 804 and 806 will pass relatively closely to one another as they move to their assigned post locations. This is inefficient and means that locations 814 and 818 will lack coverage for a substantially longer period of time than if ambulance 804 was moved to location 818 and ambulance 806 was moved to location 814. Accordingly, a dispatcher can clearly see how to post the ambulances more effectively simply by looking at the operational landscape provided by screen 800.

Figure 9A:
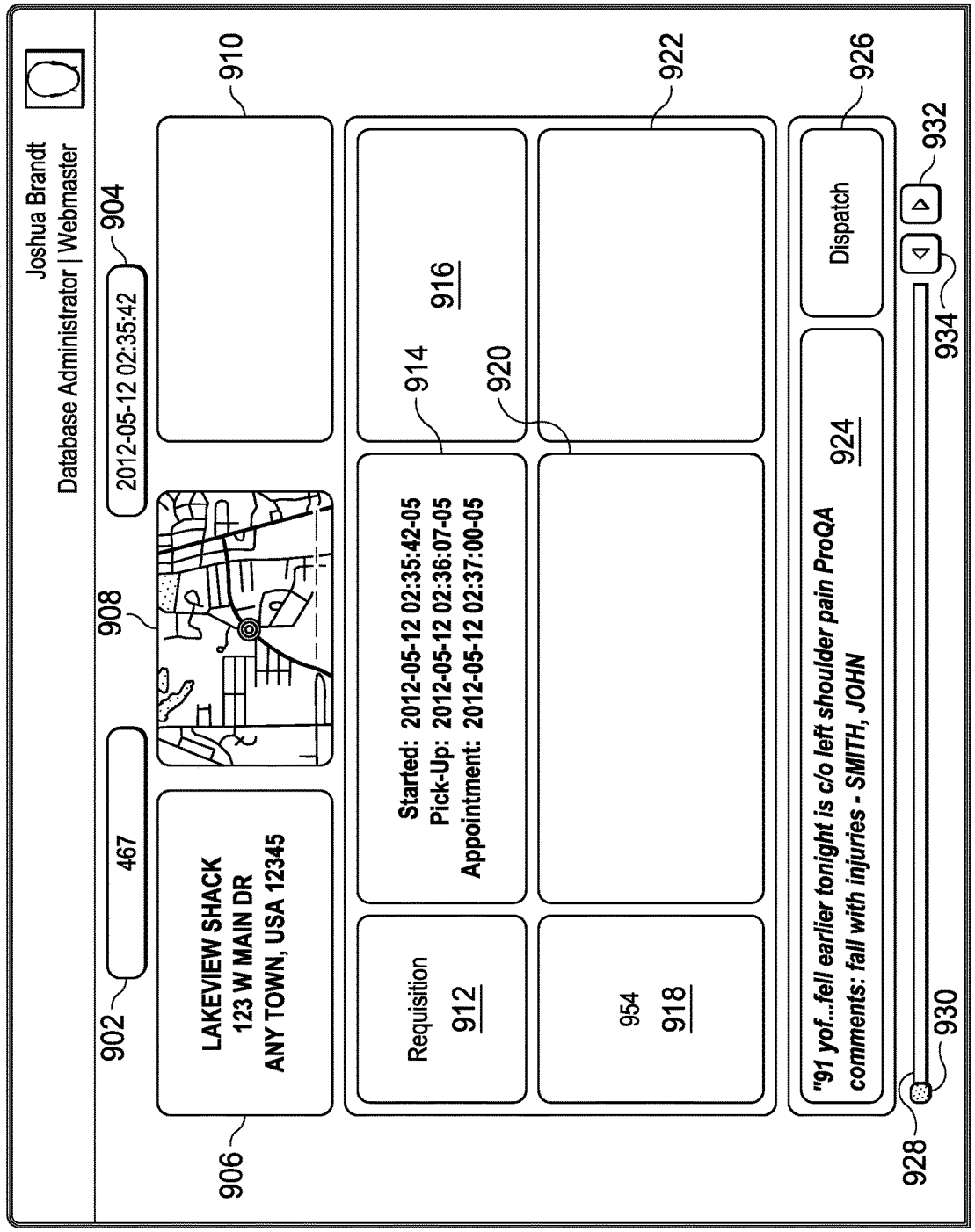
FIGS. 9A-9N illustrate embodiments of a screen displaying requisition information.

Referring to FIGS. 9A-9N, one embodiment of a display screen 900 is illustrated. The screen 900 may be produced by the resource management system 102 during or following a requisition. In the present example, the screen 900 illustrates a requisition record containing information corresponding to a single requisition as the requisition develops from incoming call receipt to final disposition. As illustrated by preceding embodiments, the resource management system 102 may handle large amounts of information pertaining to various resources, including times, locations, and status updates. Many systems do not allow this information to be manipulated once stored, which prevents data tampering.

However, the resource management system 102 may be configured to allow some or all information related to a requisition to be edited after the information is recorded within the resource management system 102, including times, locations, status updates, and/or notes. Editing may be used to correct inaccurate information. As the information may be used later by the resource management system 102 for purposes such as scheduling (described later in greater detail), the correctness of such information increases the accuracy of scheduling and other processes that may rely on the data.

One negative aspect of allowing such editing is that the information may be manipulated to produce desired results, which may actually reduce the accuracy of the results. For example, the editing may involve modifying a time when a call was assigned and/or a time when the resource was en route. The difference between the two times is the chute time, which may have a maximum time requirement as previously described. By editing either of the times from which the chute time is calculated, it may appear that the requisition met the allotted chute time requirement when it actually did not. This does not increase the accuracy of the information in the resource management system 102. However, there may be occasions when one of the times is actually incorrect, and allowing the incorrect time(s) to be edited does increase the accuracy of the information in the resource management system 102. Accordingly, the resource management system 102 allows editing to be performed, but tracks the edits. In some embodiments, the resource management system 102 may perform a real time or near real time analysis of requisition information and flag items that meet defined criteria for further review.

Referring specifically to FIG. 9A, the screen 900 is illustrated with various display sections 902-926, a time bar 928, a time slider 930, and control features such as a forward button 932 and a backward button 934. It is noted that not all sections contain information at this point in the requisition. As shown by the position of time slider 930 relative to the time bar 928, the requisition is in the initial stages and not all information has been gathered and/or entered.

Section 902 represents a requisition number (e.g., 467 in the present example). Section 904 represents a date and time of the record state, so the screen 900 of FIG. 9A represents the available information for this requisition on 2012-05-12 at 02:35:42. Section 906 represents the requisition address (e.g., the destination address for the mobile unit). Section 908 represents a map of the destination. In some embodiments, the map may be movable and/or zoomable, and/or may show the location of the mobile unit. Section 910 represents information assigned to the requisition as defined by the Presumptive Classifications tab 316 of FIG. 3 described above.

Section 912 identifies sections 914 and 916 as corresponding to requisition information, with section 914 representing times at which particular requisition stages occur and section 916 representing notes and/or system information, such as indicators as to whether a specific requisition state occurred within a certain time frame. Section 918 identifies sections 920 and 922 as corresponding to unit 954, which is an identifier for the particular ambulance to which the requisition has been assigned. Section 920 represents times at which unit 954 takes particular actions and section 922 represents notes and/or system information, such as indicators as to whether a specific action occurred within a certain time frame. Section 924 represents notes, which are identified by section 926 as being from dispatch.

The time slider 930 may be selected and moved manually along the time bar 928 to move through the record. The time in section 904 will show the current time of the record based on the location of the time slider 930 along the time bar 928. This process allows the requisition to be viewed as it happened, including the addition of information during the requisition and any modifications to information. Additionally or alternatively, the forward button 932 and backward button 934 may be used to jump from the current location to the next or previous change, respectively, in the record. This enables the record to be viewed in terms of changes without requiring a user to use the time slider 930 to locate such changes. As records may be altered after the requisition is completed (e.g., a comment or time may be modified weeks later if allowed by the resource management system 102), the forward button 932 and backward button 934 enable even post-requisition changes to be quickly located.

In the present example, the requisition record was started at 02:35:42, which is when the incoming call was received by the CAD system 110. In the present example, the "−05" suffix following the time stamp represents the time zone. In non-emergency requisitions, such as regular medical transport calls to move a patient, an appointment may be made. In such non-emergency requisitions, the actual pick-up time representing when the ambulance picked up the patient may vary from the appointment time depending on the amount of time needed to transport the patient, whether the pick-up occurred on time, and similar factors. In emergency requisitions, the pick-up and appointment times may be similar or identical. Comments may be appended to the record by dispatch (with the particular dispatcher who entered the comments identified by name) indicating the problem. In section 924, the dispatcher has entered a comment.

Figure 9B:
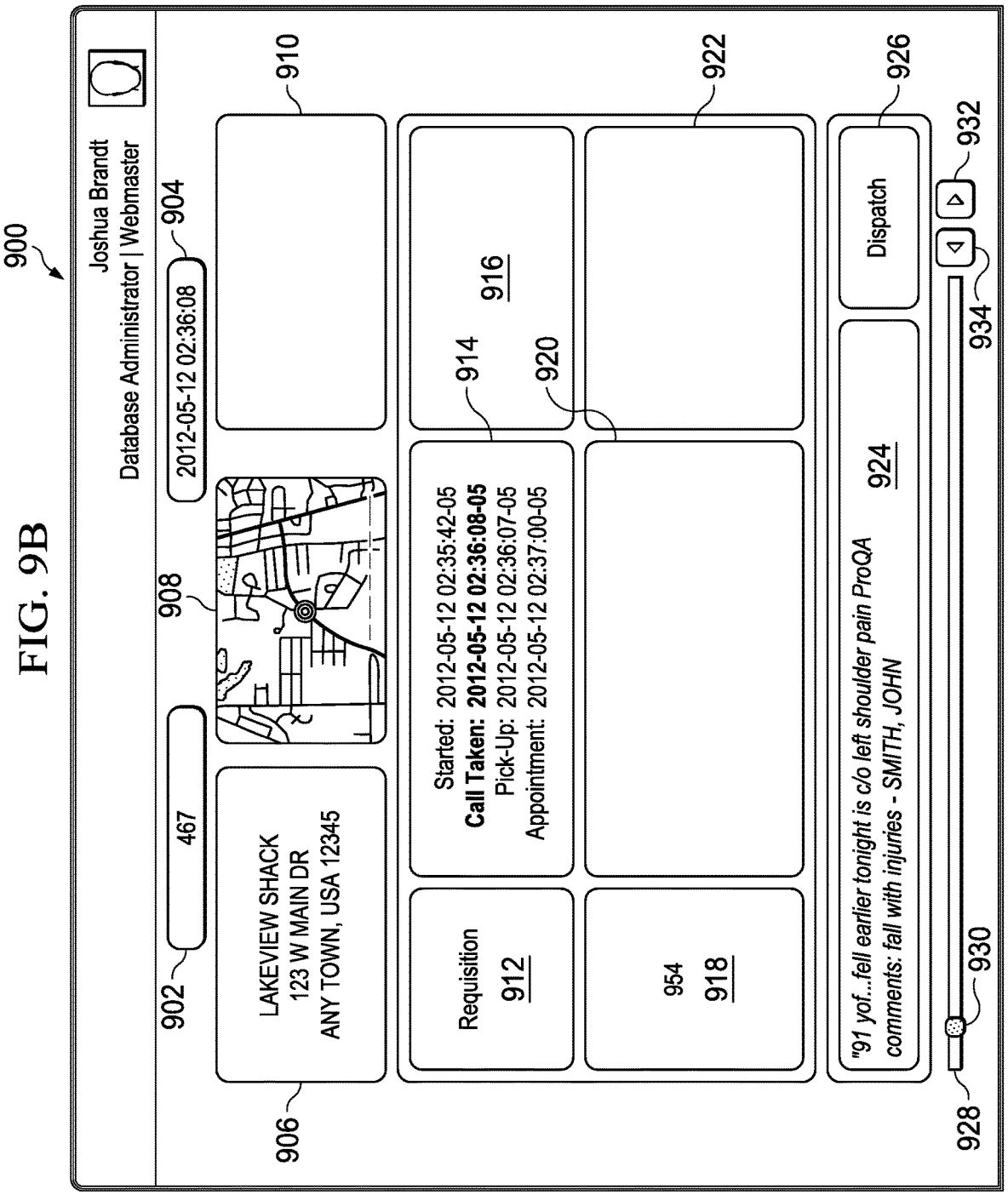

Referring specifically to FIG. 9B, as the call develops, further information and times are added to the record. As illustrated, the record has been updated to indicate that the call was taken at 02:36:08. Updates and changes may be visually indicated in various ways, such as bold text, glowing text, and/or other visual indicators that enable a viewer to quickly identify the information that has changed or been added.

Figure 9C:
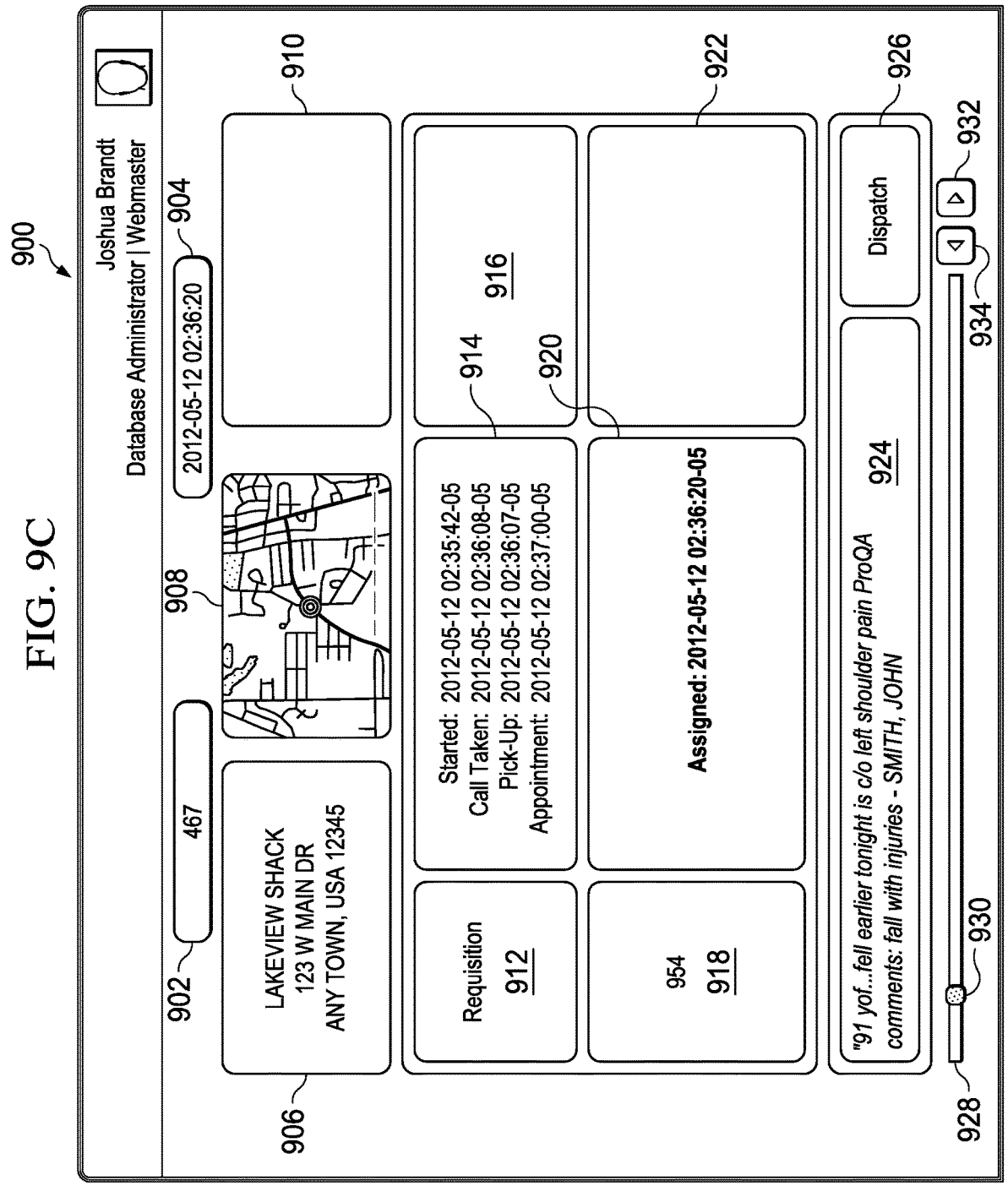

Referring specifically to FIG. 9C, the record has been updated at 02:36:20 to indicate that the call was assigned at 02:36:20.

Figure 9D:
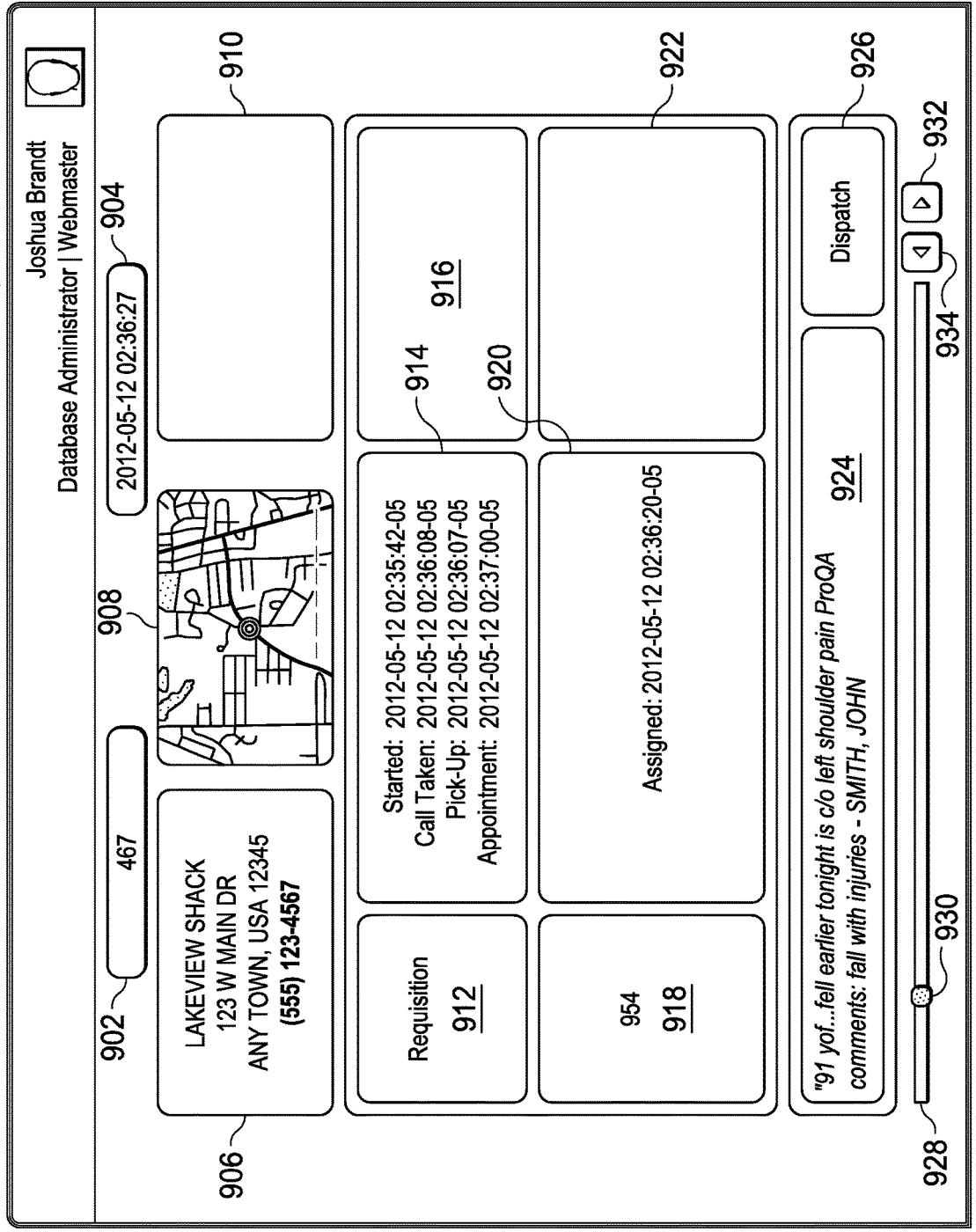

Referring specifically to FIG. 9D, the record has been updated at 02:36:27 with the phone number.

Referring specifically to FIG. 9E, the record has been updated at 02:36:36 with the address changed from "ANY TOWN" to "ANY CITY."

Figure 9F:
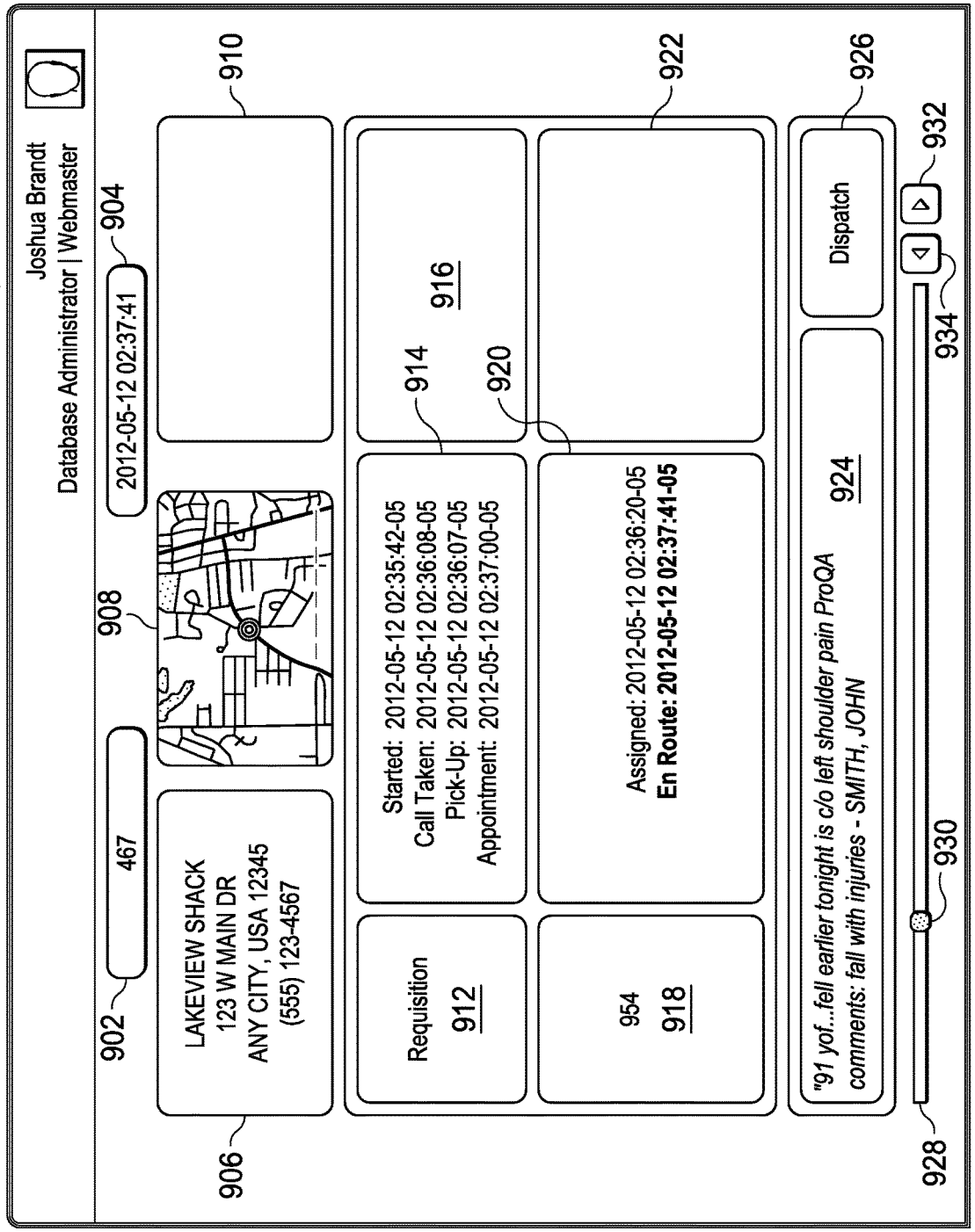

Referring specifically to FIG. 9F, the record has been updated at 02:37:41 to indicate that unit 954 was en route as of 02:37:41.

Figure 9G:
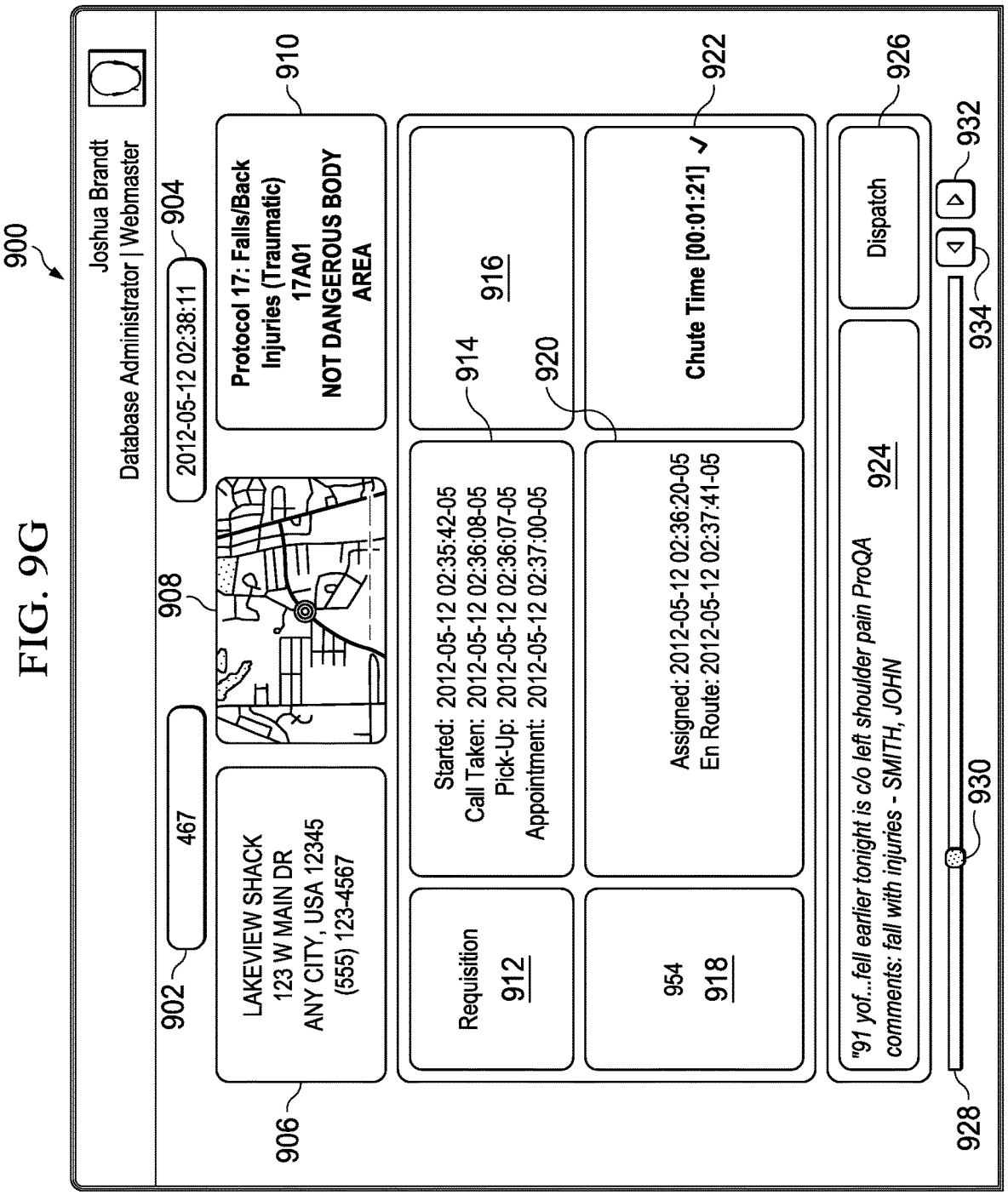

Referring specifically to FIG. 9G, the record has been updated at 02:38:11 to indicate presumptive classifications information such as code and type of injury. In addition, the resource management system 102 has calculated the chute time based on the Assigned and En Route times. The chute time is calculated as 00:01:21, which meets the compliance standard for this requisition, and the resource management system 102 indicates that the compliance time was met. For example, the resource management system 102 may place a green checkmark beside the chute time to visually indicate that the chute time was in compliance.

Figure 9H:
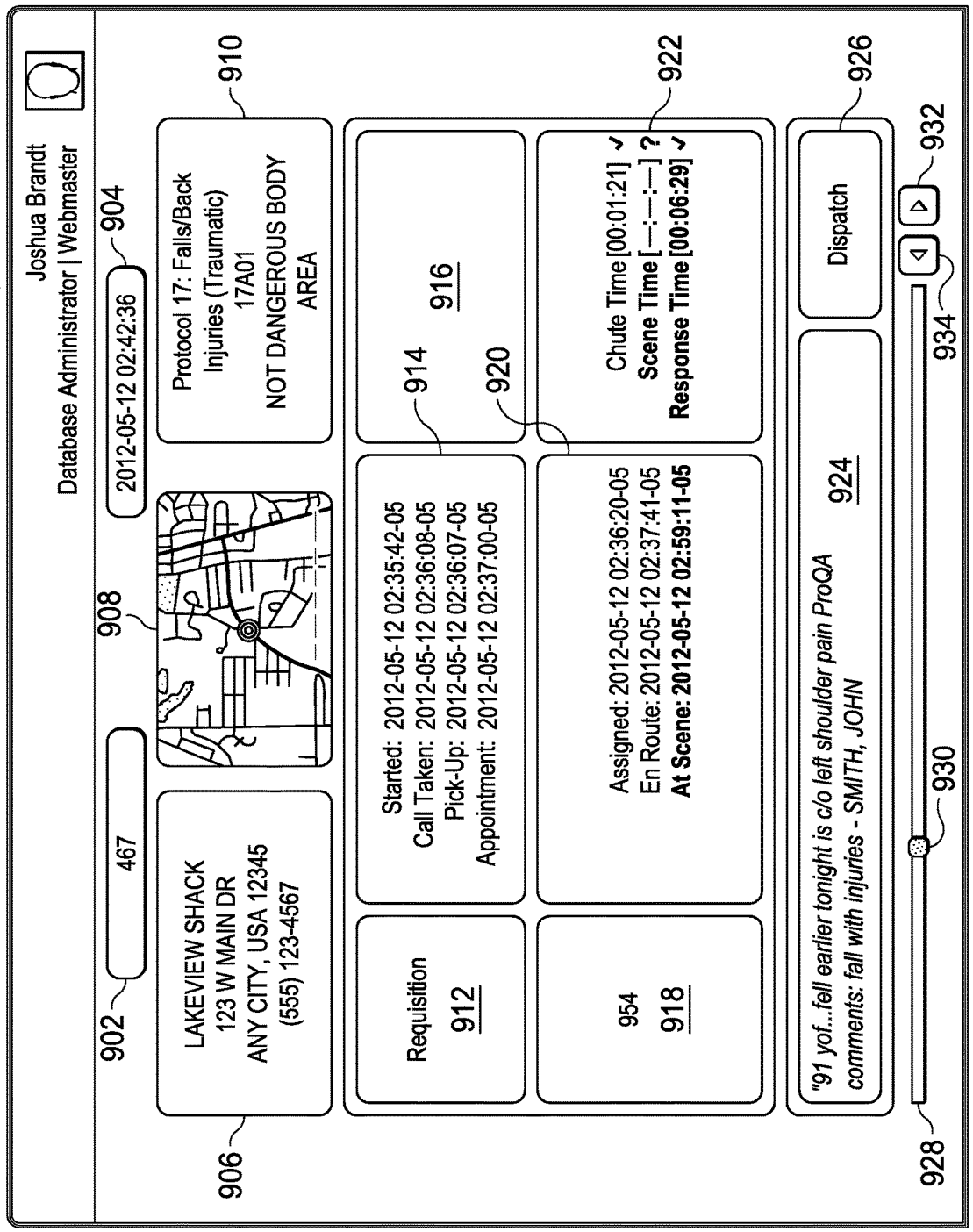

Referring specifically to FIG. 9H, the record has been updated at 02:42:36 to indicate that unit 954 arrived at scene at 02:42:36. In addition, the resource management system 102 has calculated the response time based on the Call Taken and At Scene times. The response time is calculated as 00:06:29, which meets the compliance standard for this requisition, and the resource management system 102 indicates that the compliance time was met. The scene time has not yet been calculated, and may be shown with a visual indicator such as a yellow question mark to indicate that the resource management system 102 is waiting for additional information needed to calculate this time.

Figure 9I:
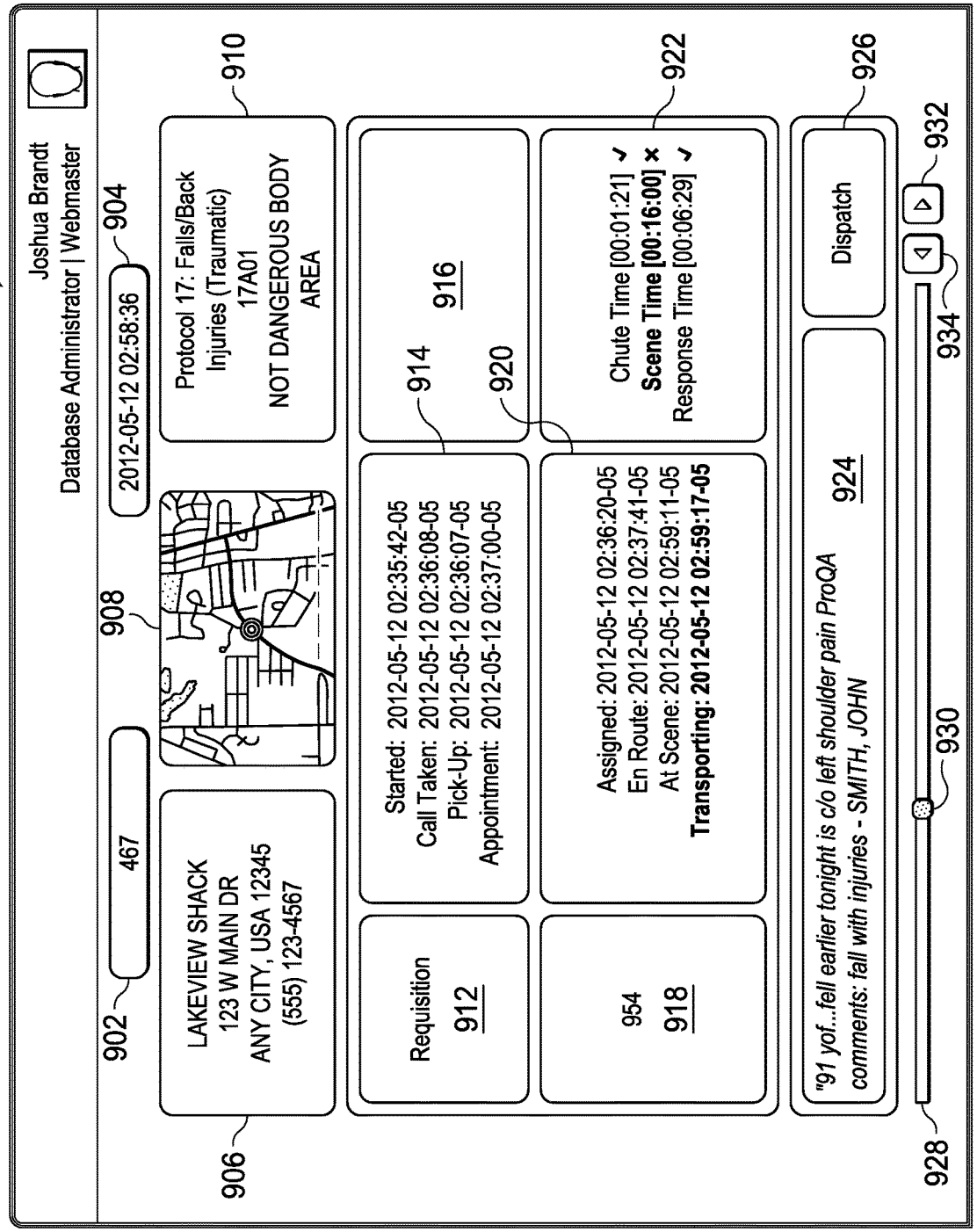

Referring specifically to FIG. 9I, the record has been updated at 02:58:36 to indicate that unit 954 begin transport at 02:58:36. This allows the resource management system 102 to calculate the scene time as 00:16:00, which fails to meet the compliance standard for this requisition. Accordingly, the resource management system 102 indicates that the compliance time was not met. For example, the resource management system 102 may place a red "X" beside the scene time to visually indicate that the scene time was not in compliance.

Referring specifically to FIG. 9J, the record has been updated at 02:59:11 to indicate that unit 954 arrived on scene at 02:59:11, rather than the previously indicated 02:42:36. The record now indicates that unit 954 arrived on scene after transport began. The resource management system 102 recalculates the scene time's compliance as −00:35:00, which meets the compliance standard for this requisition. However, because the scene time changed from non-compliant to compliant, the resource management system 102 flags the scene time to visually indicate this issue. It is noted that, in some embodiments, a negative time may be flagged or rejected as the time fails to match a realistic scenario. Because the scene time has changed, the resource management system 102 also recalculates the response time as 00:23:04, which is no longer in compliance. Accordingly, the resource management system 102 changes the response time's compliance status to indicate that the response time is not in compliance. While some embodiments may visually flag this change from compliance to non-compliance, the present embodiment does not.

Figure 9K:
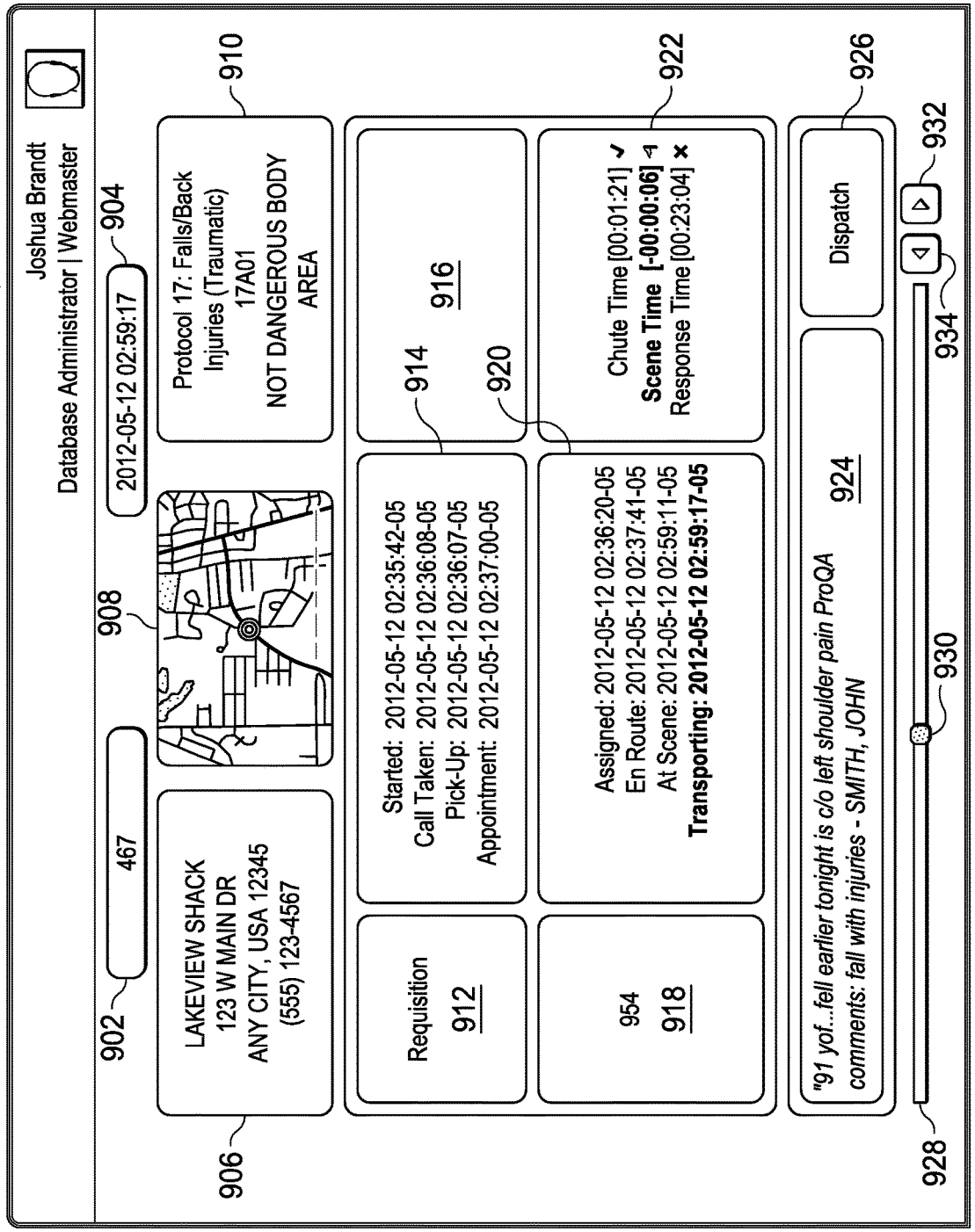

Referring specifically to FIG. 9K, the record has been updated at 02:59:17 to indicate that unit 954 began transport at 02:59:17, rather than the previously indicated 02:58:36. The resource management system 102 recalculates the scene time's compliance as 00:06:00, which meets the compliance standard for this requisition. However, because the scene time previously changed from non-compliant to compliant, the resource management system 102 will leave the scene time flagged.

Figure 9L:
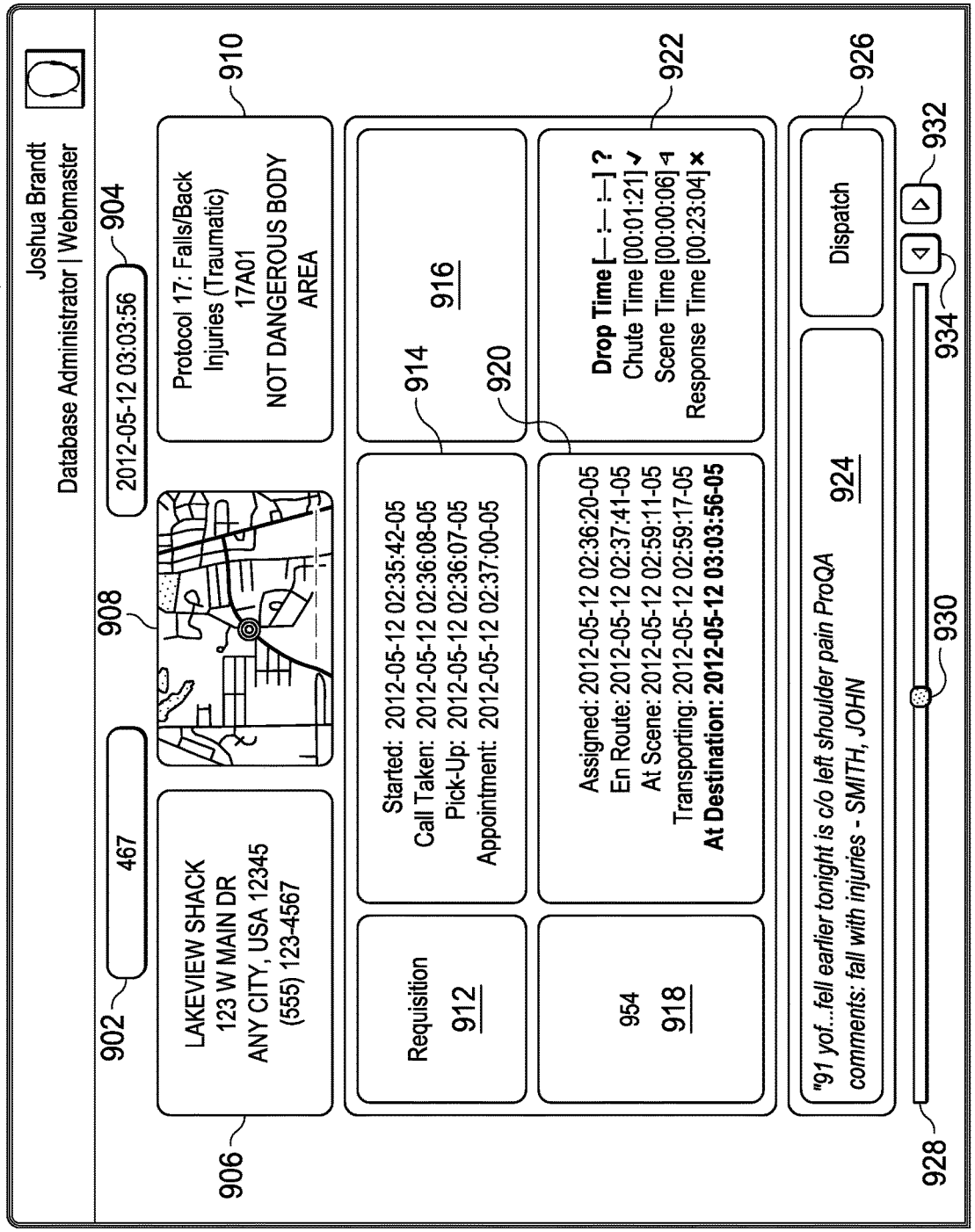

Referring specifically to FIG. 9L, the record has been updated at 03:03:56 to indicate that unit 954 arrived at the transport destination at 03:03:56. The drop time has not yet been calculated, and may be shown with a visual indicator such as a yellow question mark.

Figure 9M:
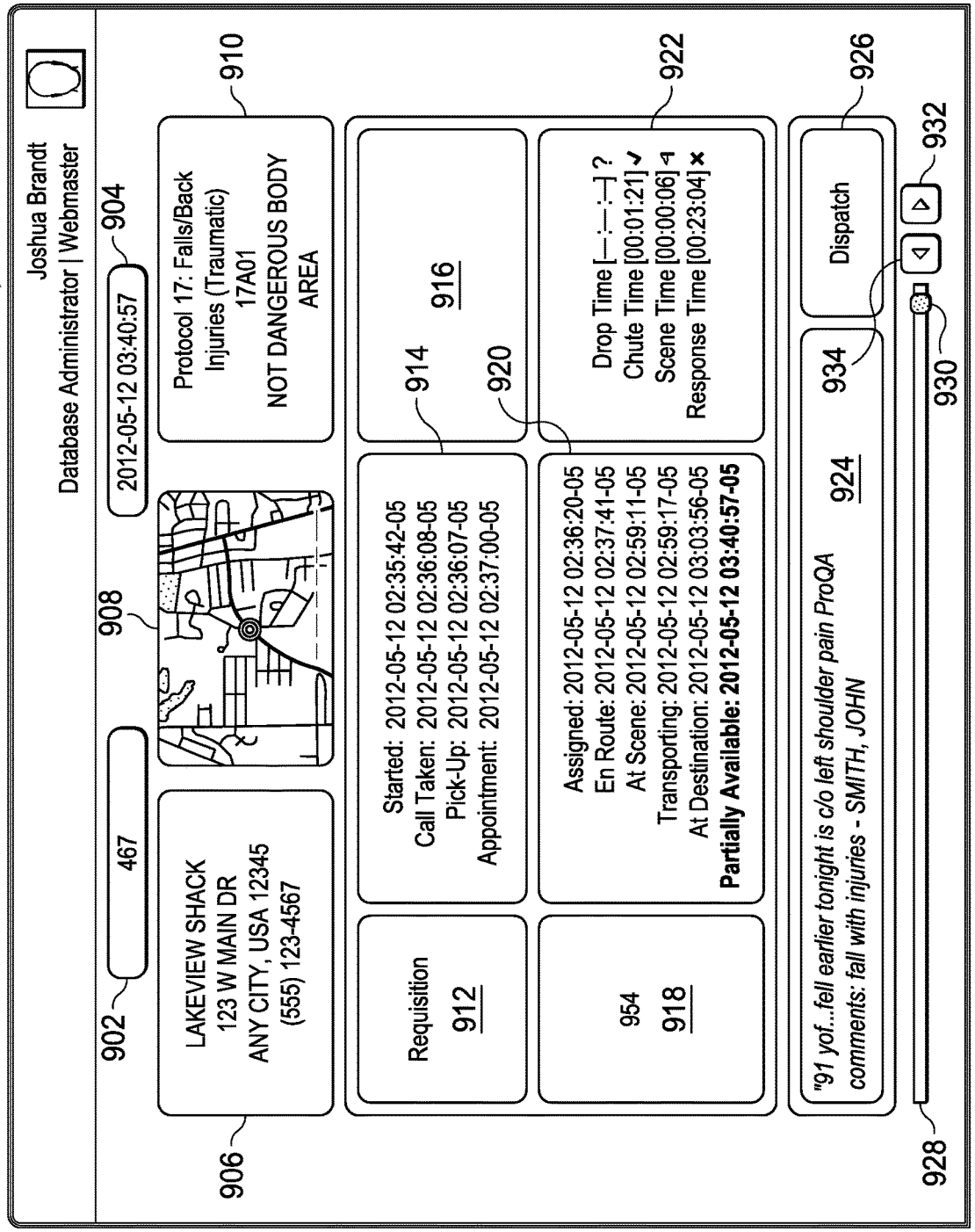

Referring specifically to FIG. 9M, the record has been updated at 03:40:57 to indicate that unit 954 changed status to partially available at 03:40:57. The drop time has still not been calculated.

Referring specifically to FIG. 9N, the record has been updated at 03:40:59 to indicate that unit 954 changed status to unassigned at 03:40:59. This allows the resource management system 102 to calculate the drop time as 00:37:03, which fails to meet the compliance standard for this requisition. Accordingly, the resource management system 102 indicates that the compliance time was not met.

Figure 10:
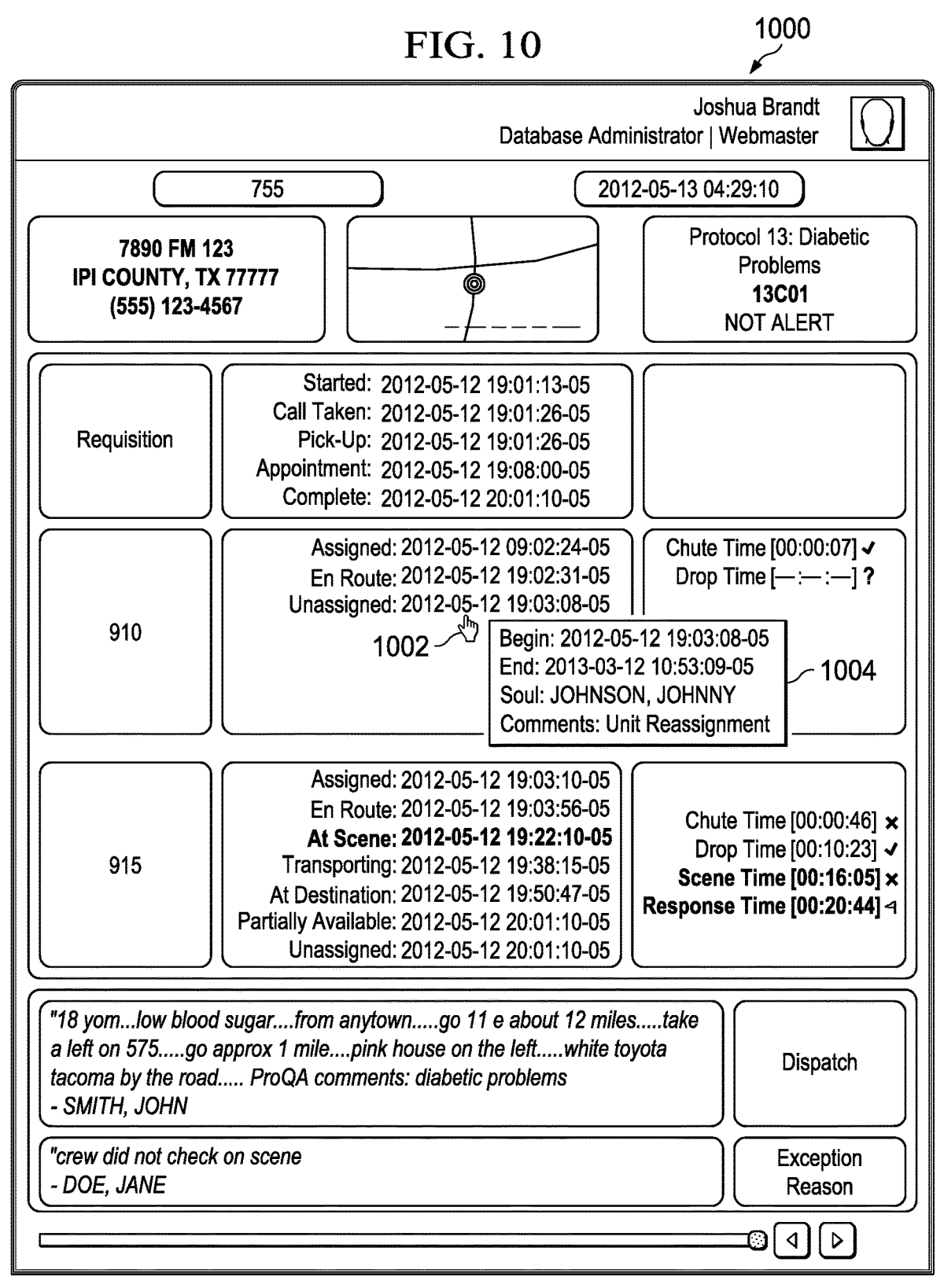

Referring to FIG. 10, one embodiment of a display screen 1000 is illustrated. The screen 1000 may be produced by the resource management system 102 during or following a requisition and has a similar or identical layout as the screen 900 of FIG. 9A. Accordingly, the process of updating the screen 1000 and the information displayed therein are not described in detail herein.

In the present example, two units 910 and 915 were assigned to the same requisition. From the record state provided by screen 1000, it appears that the unit 910 was en route and then unassigned at 19:03:08. Unit 915 was assigned shortly thereafter at 19:03:10 to handle the requisition. However, the record does not indicate what happened for this to occur.

As illustrated in FIG. 10, placing pointer 1002 over or otherwise selecting information on the screen 1000 may cause a pop-up text box 1004 to be displayed. The text box 1004 provides additional details (if available) corresponding to the information over which the pointer is located, which in this case is the time at which unit 910 was unassigned. The name of the individual entering the information is provided along with any comments, as well as dates indicating the time range covered by the pop-up box. In this case, the comments indicate that unit 910 was reassigned. Although not indicated, one possible scenario is that a higher priority requisition came in and unit 910 was the closest ambulance. Therefore, dispatch may have reassigned unit 910 to the higher priority requisition and then assigned unit 915 to handle the current non-emergency requisition. Accordingly, additional details may be available on a per entry basis as illustrated in FIG. 10. In some embodiments, such information may always be displayed, such as in another section of the screen 1000, or may be displayed on another page that is loaded when the information is selected.

Referring to FIG. 11, a method 1100 illustrates one embodiment of a process that may be executed within the resource management system 102 of FIG. 1. Although not shown, prior to the execution of the method 1100, the resource management system 102 may have obtained information from one or more of the CAD system 110, weather data 116, resource (e.g., person and/or vehicle) data 118, and manually entered data 120 via network 122. Accordingly, the resource management system 102 may have data detailing calls made to the CAD system 110, response times of the mobile unit 108, weather conditions, and other information. It is noted that the discussion of FIG. 11 is directed to an ambulance service provider and refers to mobile resources as units, but FIG. 11 may be used in many different environments where mobile resources are allocated and is not limited to ambulance services.

In step 1102, the resource management system 102 measures what happened in the past, as will be explained in greater detail with respect to FIG. 12. In step 1104, performance is calculated, as will be explained in greater detail with respect to FIG. 13. In step 1106, demand is predicted (e.g., what is going to happen in the future in terms of communications and operations), as will be explained in greater detail with respect to FIG. 14. In step 1108, a schedule is built, as will be explained in greater detail with respect to FIG. 15. In step 1110, a deployment may be built to provide a geographic and time based plan for resource allocation, as will be explained in greater detail with respect to FIG. 16.

With additional reference to FIG. 12, step 1102 of FIG. 11 is illustrated in greater detail. In step 1202, a timeline is created with a start time (e.g., months, days, hours, minutes, and seconds) and an end time with defined intervals in a geographic deployment area. For example, if the start time and end time define one day (e.g., a single twenty-four period) and the defined intervals are in minutes, there would be 1440 intervals.

In step 1204, all time windows when units were scheduled within the timeline are plotted. Each time window includes a start time, an end time, and the time between the start and end times. Accordingly, if a unit was scheduled from 2:00 PM to 6:00 PM, the start time would be 2:00 PM, the end time would be 6:00 PM, and the window would include the four hours between the start and end times. It is understood that there may be overlapping windows if two or more units are scheduled at the same time.

In step 1206, all time windows when units were mission ready are plotted. For example, a unit may be scheduled, but not actually ready to respond to a call (e.g., there may have been a vehicle malfunction, the unit may have run out of oxygen, or the driver may have been temporarily absent). In addition, there may be a geographic component to this. For example, a unit may be ready, but not yet in place to respond to calls.

In step 1208, all time windows when units were assigned (e.g., actively engaged in a requisition) are plotted. It is noted that a single unit may be assigned to multiple requisitions. For example, in some systems, a requisition may exist for every patient, while in other systems a requisition may exist for an incident. In a patient based system, one ambulance carrying two patients would show two requisitions for that ambulance at the same time. In an incident based system, the same ambulance would show one requisition if the two patients were from the same incident (e.g., a fire or a car accident).

In step 1210, all time windows when an assigned unit met a defined standard are plotted (e.g., was successful or unsuccessful). For example, if the unit was to respond within ten minutes, step 1210 would indicate whether the unit successfully met that threshold.

In step 1212, the total number of assigned units for each defined interval are added to arrive at a total for that interval. For example, if a single unit is assigned during each of the 1440 intervals on the twenty-four hour period, there would be a value of one for each of the 1440 defined intervals. In another example, if a second unit was on duty for twelve hours, there would be a value of one for seven hundred and twenty of the intervals when only one unit was assigned, and a value of two for the other seven hundred and twenty units when both units were assigned.

In step 1214, the resulting numbers may be displayed, etc. It is understood that this need not happen, and that the results may be graphically displayed, used in later steps, and/or used in many other ways. This may occur during or following each step of FIG. 11.

Figure 13:
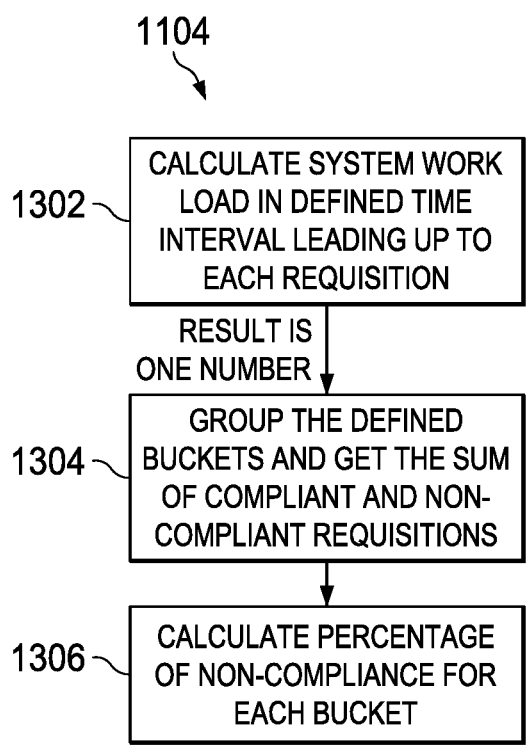

With additional reference to FIG. 13, step 1104 of FIG. 11 is illustrated in greater detail. This step may be used to identify an ideal work load where human resources are not overworked or underworked, but are working at an optimal or near optimal level. In step 1302, a system work load is calculated in a defined time interval leading up to every requisition. For example, the time interval may be defined as ten minutes and the system work load may be calculated for every requisition over a twenty-six week period. In the current example, the system work load equals the number of assigned units divided by the number of mission ready units (e.g., system work load=assigned units/mission ready units). This results in a single number for each defined interval, as there would be some number of units assigned and mission ready in the range of zero to a maximum number of units.

For example, if the interval is ten minutes and there were five assigned units during that ten minute interval, there are fifty total minutes of assigned time. The system work load represents how many units were actively assigned to work during the fifty total minutes. Accordingly, if three units were assigned for that ten minutes, that is thirty minutes of the fifty minute total, which equals a sixty percent workload (e.g., 0.6).

In step 1304, the numbers are grouped by defined buckets, which may be any bucket type desired (e.g., numbers, number ranges, or time ranges). It is noted that time ranges may require a relatively high call volume to be useful as a bucket. For each defined bucket, a sum of requisitions and a sum of non-compliant requisitions are obtained. For example, if there is a bucket for 0.6 (e.g., a sixty percent work load), the system first totals the number of 0.6 values. Assume for purposes of example that there are thirty 0.6 values. The system then sums the number of those thirty calls (e.g., the 0.6 calls) that were non-compliant. For example, six of the thirty calls may have been non-compliant.

In step 1306, a percentage of non-compliance is calculated for each bucket. Continuing the example, six non-compliant calls out of a total of thirty calls would be a non-compliance percentage of twenty percent (e.g., 0.2). The performance may then be calculated based on the workload and non-compliance. For example, if the lowest level of non-compliance is in the 0.4 bucket, then the schedule should plan for a forty percent workload because that is the workload at which the units perform the best.

Figure 14:
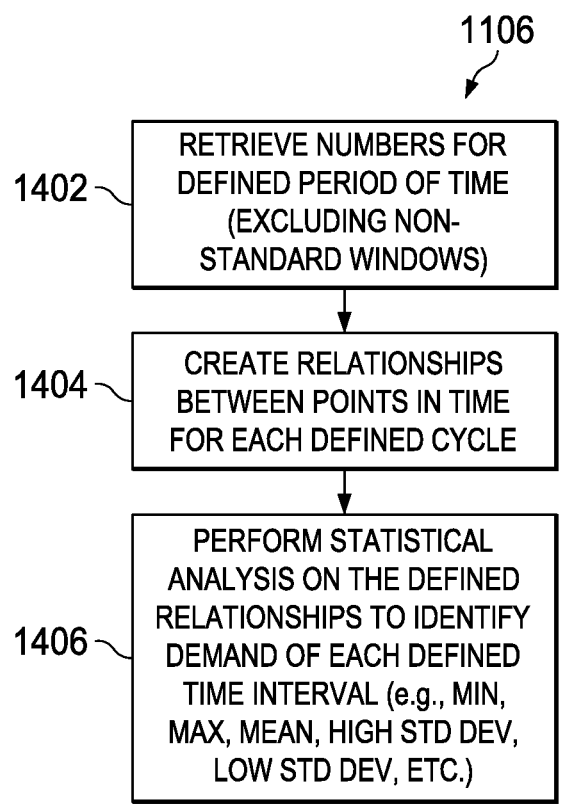

With additional reference to FIG. 14, step 1106 of FIG. 11 is illustrated in greater detail. In step 1402, numbers are retrieved for the defined period of time (e.g., twenty-six weeks). Non-standard windows may be excluded. For example, holidays may be non-standard events and so may be excluded as they may skew the results for the other weeks. In other words, if a holiday occurs on a Friday, comparing that Friday to the other twenty-five Fridays may change the result when, in reality, the holiday is a non-standard event and occurrences on that day should not be viewed the same as occurrences on standard days due to likely changes in call volume, traffic patterns, population behavior such as heavy shopping crowds, and similar factors.

In step 1404, relationships are created between points in time for each defined cycle. For example, if the defined cycle is one week, there will be data from twenty-six cycles. A relationship may be created for a particular time (e.g., Monday at 12:00 PM) and there will be at most twenty-six data points (e.g., observations) in the relationship. Accordingly, if there are 1440 intervals per day and seven days per week, a relationship may have twenty-six matching data points for any given interval. For example, the $645^{th}$ interval on Tuesday will be grouped with the $645^{th}$ intervals for the other twenty-five Tuesdays.

In step 1406, statistical analysis may be performed on the defined relationships to identify demand for a defined time interval (e.g., Monday at 12:00 PM). This may be used to identify the highest level of resources that were needed over the twenty-six weeks, the lowest level of resources that were needed, and similar information. It is noted that this methodology does not predict outliers, but instead predicts normal resource allocation needs based on past demand for a particular time interval (e.g., one minute) for a particular day. For example, the demand may be predicted for 12:00 on Monday, and that prediction will be valid for the next Monday. The same prediction will not be valid for the Monday following the next Monday, which will instead have a prediction that is calculated based on a sliding window that will incorporate the actual results of the current prediction (assuming that next Monday will have occurred and that actual data will have been obtained when the next prediction is made).

Figure 15:
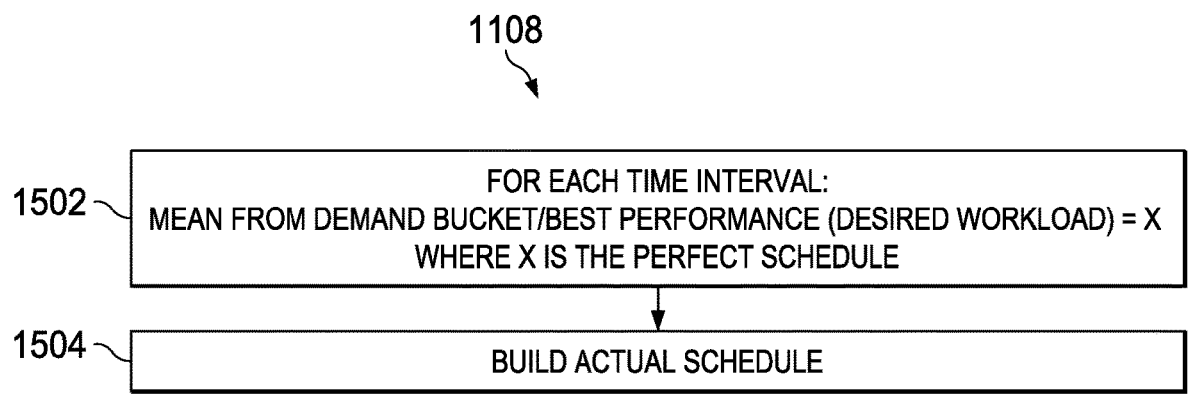

With additional reference to FIG. 15, step 1108 of FIG. 11 is illustrated in greater detail. In step 1502, for each point in time (e.g., one hour increments, ten minute increments, one minute increments, or some other defined interval), a value X is calculated for the perfect schedule, where X equals the mean from the demand bucket divided by the desired workload (i.e., performance). In other words, X=mean from demand bucket/performance. It is understood that while the mean may change based on the point in time for which the calculation is occurring, the desired workload does not change for this schedule.

Accordingly, the method 1100 calculates the ideal schedule for a single point in time (e.g., 12:00 PM on Monday). The mean demand at 12:00 PM on Monday (as calculated using the matching data points across twenty-six weeks) is found. The performance data is examined to identify the ideal workload (e.g., the best performance occurred at 40% workload, regardless of whether this performance occurred at 12:00 PM on Monday). Using this mean demand and best workload, the ideal schedule can be calculated for a particular point in time.

It is noted that step 1502 may not build a schedule that is actually to be implemented, but instead produces an ideal schedule based on the previous steps. However, the ideal schedule is likely not feasible. For example, the ideal schedule may have people scheduled for impractical shifts, such as a three minute work shift followed by twelve minutes off, another eighteen minutes on, et cetera. As this is not a schedule that is realistically viable, the ideal schedule may be used as a guide to create a realistic schedule that takes into account human scheduling, work laws, and similar factors. The realistic schedule may be created using information from the ideal schedule, and may be based on a visual representation of the ideal schedule.

Accordingly, in step 1504, an actual schedule may be built. While the ideal schedule may not be feasible, it provides an outline for the actual schedule. For example, the ideal schedule may show that 5000 hours are needed for the next week. The actual schedule may then attempt to match the 5000 hours by assigning personnel to realistic shifts. While the actual schedule may not match the ideal assignments represented in the ideal schedule, the actual schedule may use the ideal assignments to determine when to increase and decrease assigned hours. For example, if the ideal schedule shows that Friday evening requires a higher number of hours than Thursday evening, the actual schedule can incorporate this information by allocating more hours on Friday night than Thursday night even though the schedule for those hours will likely not exactly match the ideal schedule.

Figure 16:
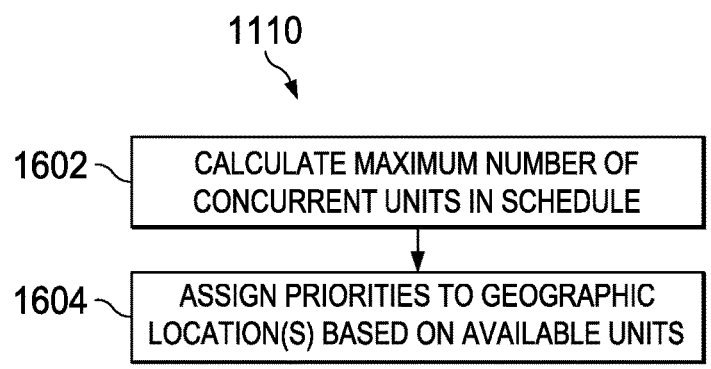

With additional reference to FIG. 16, step 1110 of FIG. 11 is illustrated in greater detail. In step 1602, a maximum number of concurrent units in the schedule is calculated. For example, there may be ten units assigned to work a particular shift. In step 1604, priorities are assigned to one or more geographic locations based on the number of available units. For example, if only one of the ten units is available, a single geographic location will be assigned to that unit. If two units are available, two geographic locations will be assigned (one of which may or may not be the location assigned to the single available unit). This process may continue for each number of available units, with ten locations being assigned if all ten units are available.

Figure 17:
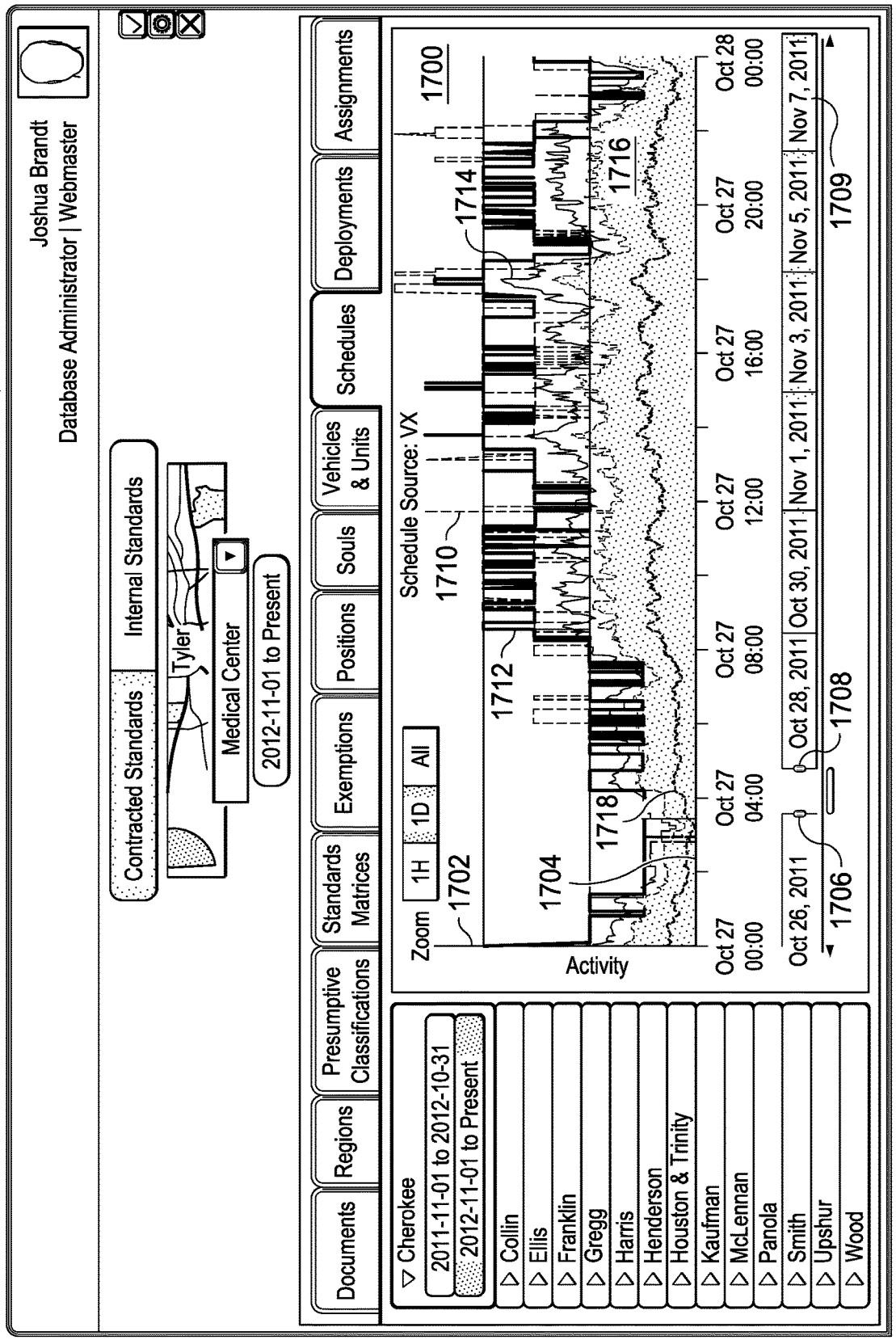
FIG. 17 illustrates one embodiment of a chart representing a demand analysis that may be calculated using the method of FIG. 11.

Referring to FIG. 17, a display screen 1701 includes a chart 1700 that illustrates one embodiment of a demand analysis that may be created using method 1100 of FIG. 11. Chart 1700 shows a single day of demand, with information charted against a y-axis 1702 representing activity (in number of units) and an x-axis 1704 representing time. Time sliders 1706 and 1708 may be used to set start and end points, respectively, along a timeline 1709 to define the time period reflected by the x-axis 1704 and displayed as the chart 1700.

Line 1710 represents the maximum number of concurrent units actively assigned to a requisition at that point in the sample period. For example, if the sample period is twenty-six weeks and is looked at on a per minute basis, there would be twenty-six minutes from which to choose for a given minute of the chart 1702. The maximum number of concurrent units actively assigned to a requisition across the twenty-six minutes would be selected. In other words, this represents a real world, worst case scenario.

Line 1712 represents the perfect schedule. Line 1714 represents 1.96 standard deviations above the mean. Statistically speaking this is very specific, but in general, the call volume will be less than this line 97.5% of the time. The shaded area 1716 represents 1.0 standard deviation above and below the mean. The smaller the range, the more consistent the workload. Line 1718 represents the mean.

Figure 18:
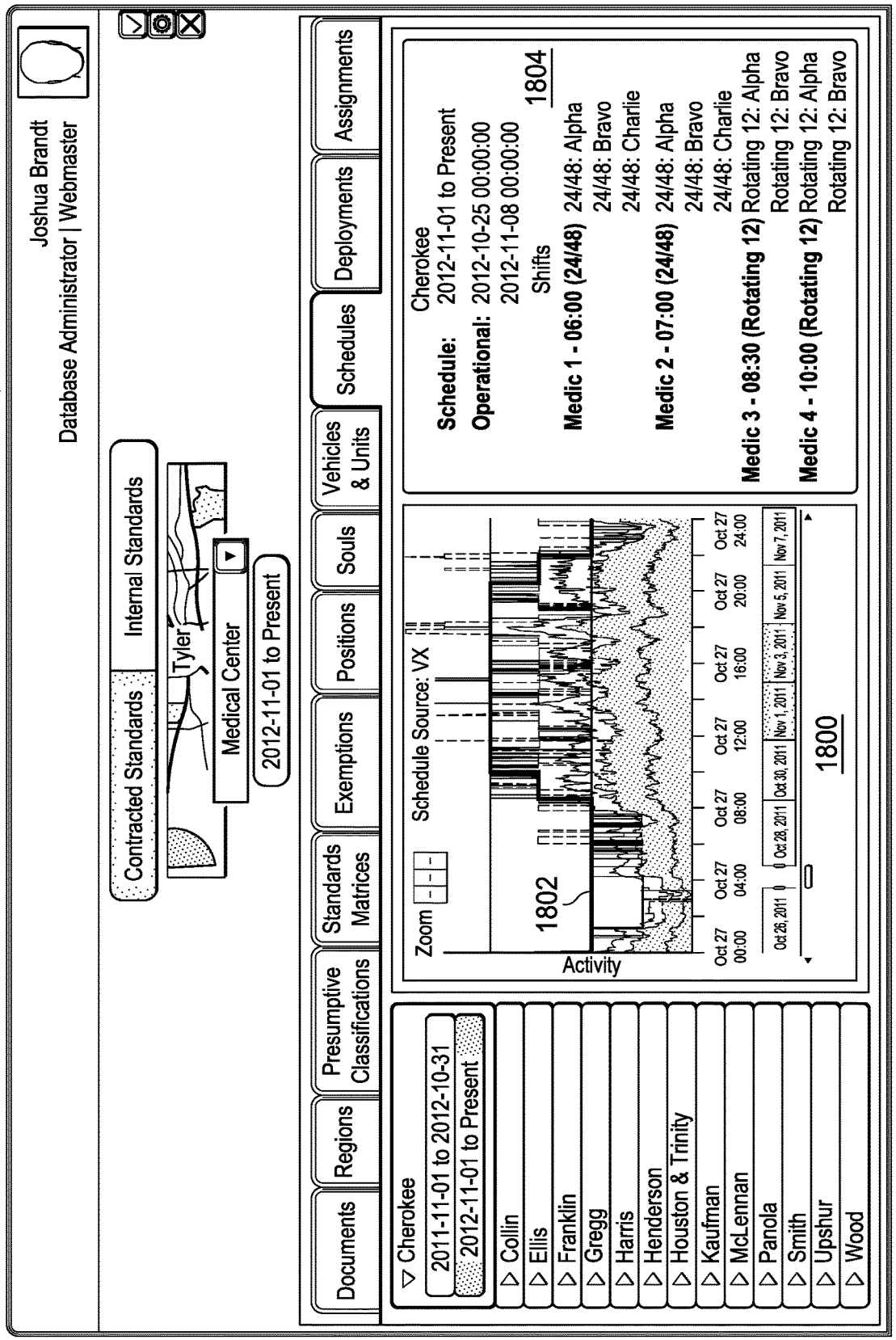
FIG. 18 illustrates the chart of FIG. 17 with the addition of a schedule line.

Referring to FIG. 18, a display screen 1801 includes a chart 1800 illustrates one embodiment of the chart 1700 of FIG. 17 with the addition of a schedule line 1802. The schedule line 1802 represents an actual schedule that was created based on the demand analysis of chart 1800. For October 27$^{th}$, the day displayed by chart 1800, there are up to four units scheduled.

Details are provided by text box 1802, which shows that Medic 1 is based on a 6:00 AM start time and operates on a 24/48 schedule (e.g., twenty-four hours on and forty-eight hours off). Three units Alpha, Bravo, and Charlie are assigned to cover this shift. Medic 2 is based on a 7:00 AM start time and operates on a 24/48 schedule. Three units Alpha, Bravo, and Charlie (not the same as those on Medic 1) are assigned to cover this shift. Medic 3 is based on an 8:30 AM start time and operates on a rotating 12 schedule (e.g., twelve hours on and twelve hours off). Two units Alpha and Bravo (not the same as those on Medics 1 and 2) are assigned to cover this shift. Medic 4 is based on a 10:00 AM start time and operates on a rotating 12 schedule. Two units Alpha and Bravo (not the same as those on Medics 1, 2, and 3) are assigned to cover this shift.

Accordingly, the schedule line 1800 provides a workable schedule that provides from two to four units on staggered start times based on past demand. This schedule may be based on the demand calculated as described previously.

It will be appreciated by those skilled in the art having the benefit of this disclosure that the dispatch system disclosed herein provide advantages in the management of mobile resources. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A dispatch system, comprising:
   a network interface;
   a display;
   a memory;
   at least one processor coupled to the network interface, the display, and the memory;
   one or more mobile units configured to transmit a plurality of information including global positioning system (GPS) information, mobile unit diagnostic information, and mobile unit personnel information to the network interface;
   a database storing the plurality of information received from the one or more mobile units, wherein the plurality of information is stored in a first data format;
   a requisition interface presented on the display, the processor populating the requisition interface by retrieving from the database at least a portion of the plurality of information and normalizing the at least a portion of the plurality of information into a second data format for use by the dispatch system,
   the requisition interface including a plurality of user interface sections separated in the requisition interface by tabs each associated with one of the plurality of user interface sections, the requisition interface alternatively switching between the plurality of user interface sections based on one or more user inputs, wherein the requisition interface provides requisition information corresponding to one or more requisitions involving the one or more mobile units, wherein at least some of the requisition information includes time-stamped events, wherein the requisition interface updates as additional requisition information corresponding to the one or more requisitions is received, and wherein the plurality of user interface sections of the requisition interface includes:
- a regions section including selectable geographical region windows each associated with a geographical region, wherein, upon selection of a particular geographical region window, the processor:
  - accesses a digital map of the geographical region associated with the particular geographical region window via one or more application program interfaces (APIs) and causes the accessed map to be displayed in a portion of the requisition interface on the display, and
  - expands the particular geographical region window to display a time frame in which records or other information are available for the geographical region,
- a mobile units section including information on the one or more mobile units including status, current location, and assigned location,
- a schedules section including the selectable geographical region windows wherein, upon selection of one of the selectable geographical region windows while the schedules section is displayed in the requisition interface, the processor:
  - causes a presentation on the display of a resource allocation schedule related to the geographic region associated with the selected one of the selectable geographical region windows, wherein the resource allocation schedule is presented in a subsection of the schedules section of the requisition interface separate from the selectable geographical region windows,
  - calculates at least one time value based on a difference in time-stamps of two of the time-stamped events,
  - updates the schedules section of the requisition interface to visually mark on the requisition interface the time value as compliant or non-compliant based on whether the time value is in compliance with a defined standard,
  - identifies that a time-stamp for one of the time-stamped events has been changed, and, in response, re-calculates a time value based on the changed time-stamp,
  - updates the schedules section of the requisition interface to visually mark the time value as compliant or non-compliant based on whether the re-calculated time value is in compliance with a defined standard, and flag the time value if the time value was previously non-compliant and changed to compliant,
  - generates a display of a sliding time window in a subsection of the schedules section of the requisition interface separate from the resource allocation schedule, wherein the sliding time window is a pre-defined interval of time prior to a current time, the pre-defined interval of time being continuously updated as the current time updates, and wherein a current display of the resource allocation schedule is associated with and updates in response to a current display of the sliding time window,
  - tracks assigned mobile units and mission ready mobile units over time based on the sliding time window and based on the plurality of information received from the one or more mobile units,
  - calculates, at the time each of the one or more requisitions is made, a workload value for each requisition over the pre-defined interval of time that is immediately prior to the time of the requisition, wherein each of the workload values equals a total number of assigned mobile units divided by a number of mission ready units during an entire length of that pre-defined interval,
  - calculates a percentage of non-compliant requisitions by dividing a number of non-compliant requisitions by a total number of requisitions associated with a particular workload value,
  - builds repeatedly an ideal schedule, the ideal schedule being an outline for an actual schedule, by selecting a workload value corresponding to a desired percentage of non-compliant requisitions, and by calculating a resource level required for each of a plurality of schedule times, wherein each resource level is calculated as a statistically-derived demand divided by the selected workload,
  - updates the schedules section of the requisition interface to continuously display both the ideal schedule and the actual schedule simultaneously as at least a part of the resource allocation schedule related to the geographic region for the currently selected one of the selectable geographical region windows, wherein the resource allocation schedule include a first axis corresponding to a period of time within the sliding time window and a second axis corresponding to mobile unit activity; and wherein the processor is further configured to:
- assign available mobile units to work assigned intervals of time in accordance with the actual schedule, and
- dispatch at least one available mobile unit from the assigned available mobile units in response to the one or more requisitions, a number of assigned available mobile units being in accordance with the resource allocation schedule.

* * * * *